(12) United States Patent
Hamamura et al.

(10) Patent No.: US 10,906,134 B2
(45) Date of Patent: Feb. 2, 2021

(54) GRAIN-ORIENTED ELECTRICAL STEEL SHEET

(71) Applicant: NIPPON STEEL & SUMITOMO METAL CORPORATION, Tokyo (JP)

(72) Inventors: Hideyuki Hamamura, Futtsu (JP); Tatsuhiko Sakai, Oita (JP); Hisashi Mogi, Yachiyo (JP); Fumiaki Takahashi, Kisarazu (JP); Hirofumi Imai, Kisarazu (JP); Shunsuke Okumura, Kitakyushu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 534 days.

(21) Appl. No.: 15/554,659

(22) PCT Filed: Apr. 19, 2016

(86) PCT No.: PCT/JP2016/062375
§ 371 (c)(1),
(2) Date: Aug. 30, 2017

(87) PCT Pub. No.: WO2016/171129
PCT Pub. Date: Oct. 27, 2016

(65) Prior Publication Data
US 2018/0036838 A1 Feb. 8, 2018

(30) Foreign Application Priority Data

Apr. 20, 2015 (JP) .................................. 2015-086302

(51) Int. Cl.
*H01F 1/16* (2006.01)
*C22C 38/00* (2006.01)
(Continued)

(52) U.S. Cl.
CPC .......... *B23K 26/364* (2015.10); *C21D 8/1294* (2013.01); *C22C 38/00* (2013.01);
(Continued)

(58) Field of Classification Search
CPC .... B23K 26/364; C21D 8/1294; C22C 38/00; C22C 38/60; C25F 3/06; H01F 1/16; Y10T 428/12201; Y10T 428/12215
(Continued)

(56) References Cited

U.S. PATENT DOCUMENTS 5,393,355 A 2/1995 Nakano et al.
2013/0139932 A1* 6/2013 Sakai .................. C21D 8/1266
148/565
(Continued)

FOREIGN PATENT DOCUMENTS

CN 101979676 A 2/2011
CN 102639726 A 8/2012
(Continued)

OTHER PUBLICATIONS

Koji et al., WO 2012/165393 A1, machine translation, Dec. 6, 2012, entire document (Year: 2012).*
(Continued)

*Primary Examiner* — Humera N. Sheikh
*Assistant Examiner* — Katherine A Christy
(74) *Attorney, Agent, or Firm* — Birch, Stewart, Kolasch & Birch, LLP

(57) ABSTRACT

Provided is a grain-oriented electrical steel sheet including a steel sheet having a steel sheet surface in which a groove, which extends in a direction intersecting a rolling direction and of which a groove depth direction matches a sheet thickness direction, is formed. In a case where the steel sheet surface is seen from the sheet thickness direction, the steel sheet surface is provided with a groove group that is
(Continued)

constituted by a plurality of the grooves arranged in a sheet width direction, the grooves, which constitute the groove group, are arranged in such a manner that adjacent grooves overlap each other on a projection plane perpendicular to the rolling direction, and a plurality of the groove groups are arranged with an interval in the rolling direction.

6 Claims, 20 Drawing Sheets

(51) Int. Cl.
  *B23K 26/364* (2014.01)
  *C25F 3/06* (2006.01)
  *C22C 38/60* (2006.01)
  *C21D 8/12* (2006.01)
  *H01F 1/147* (2006.01)

(52) U.S. Cl.
  CPC ............... *C22C 38/60* (2013.01); *C25F 3/06* (2013.01); *H01F 1/16* (2013.01); *C21D 2201/05* (2013.01); *H01F 1/14766* (2013.01)

(58) Field of Classification Search
  USPC .................................................. 428/573, 575
  See application file for complete search history.

(56) References Cited

U.S. PATENT DOCUMENTS

| | | | | |
|---|---|---|---|---|
| 2013/0160901 | A1* | 6/2013 | Omura | C21D 8/12 148/537 |
| 2014/0374137 | A1* | 12/2014 | Kwon | C21D 8/1288 174/126.3 |
| 2016/0333435 | A1 | 11/2016 | Inoue et al. | |

FOREIGN PATENT DOCUMENTS

| | | | |
|---|---|---|---|
| EP | 1953249 | A1 | 8/2008 |
| JP | 57-2252 | B2 | 1/1982 |
| JP | 58-19440 | A | 2/1983 |
| JP | 58-26406 | A | 6/1983 |
| JP | 62-98817 | A | 8/1987 |
| JP | 62-53579 | B2 | 11/1987 |
| JP | 62-54873 | B2 | 11/1987 |
| JP | 5-121224 | A | 5/1993 |
| JP | 11-279645 | A | 10/1999 |
| JP | 2002-121618 | A | 4/2002 |
| JP | 2003-129135 | A | 5/2003 |
| JP | 2012-102395 | A | 5/2012 |
| JP | 2015-510543 | A | 4/2015 |
| RU | 2358346 | C1 | 6/2009 |
| RU | 2371487 | C1 | 10/2009 |
| RU | 2509164 | C1 | 3/2014 |
| SU | 1744128 | A1 | 6/1992 |
| WO | WO 2007/052406 | A1 | 5/2007 |
| WO | WO 2012/033197 | A1 | 3/2012 |
| WO | WO 2012/164702 | A1 | 12/2012 |
| WO | WO 2012/165393 | A1 | 12/2012 |
| WO | WO 2015/111434 | A1 | 7/2015 |

OTHER PUBLICATIONS

International Search Report issued in PCT/JP2016/062375 (PCT/ISA/210), dated Aug. 2, 2016.
Written Opinion of the International Searching Authority issued in PCT/JP2016/062375 (PCT/ISA/237), dated Aug. 2, 2016.
Russian Office Action and Search Report for counterpart Russian Application No. 2017133773, dated Aug. 20, 2018, with an English translation.
Extended European Search Report for counterpart European Application No. 16783150.2, dated Oct. 15, 2018.
Kosuge et al., "Microstructures and Magnetic Properties of Heatproof Domain-refined Grain-oriented Silicon Steel Sheets", Journal of Materials Engineering and Performance, vol. 3, No. 6, Dec. 1, 1994, pp. 706-711.
Japanese Notification of Information Statement for counterpart Japanese Application No. 2017-514132, dated Mar. 26, 2019, with English translation.
Chinese Office Action and Search Report, dated May 3, 2018, for corresponding Chinese Application No. 201680012707.1, with an English Translation of the Search Report.
Japanese Office Action, dated Oct. 9, 2018, for counterpart Japanese Application No. 2017-514132, with an English translation.
Japanese Office Action, dated Jun. 26, 2018, for counterpart Japanese Application No. 2017-514132, with an English translation.

* cited by examiner

GRAIN-ORIENTED ELECTRICAL STEEL SHEET

Priority is claimed on Japanese Patent Application No. 2015-086302, filed on Apr. 20, 2015, the content of which is incorporated herein by reference.

TECHNICAL FIELD OF THE INVENTION

The present invention relates to a grain-oriented electrical steel sheet.

RELATED ART

In the related art, as a steel sheet for an iron core of a transformer, there is known a grain-oriented electrical steel sheet that exhibits excellent magnetic characteristics in a specific direction. The grain-oriented electrical steel sheet is a steel sheet in which a crystal orientation is controlled so that a magnetization easy axis of a crystal grain and a rolling direction match each other by a combination of a cold rolling treatment and an annealing treatment. It is preferable that an iron lass of the grain-oriented electrical steel sheet is as small as possible.

The iron loss is classified into an eddy current loss and a hysteresis loss. In addition, the eddy current loss is classified into a classical eddy current loss and an anomalous eddy current loss. Typically, there is known a grain-oriented electrical steel sheet in which an insulating film is formed on a surface of a steel sheet (base metal) of which a crystal orientation is controlled as described above so as to reduce the classical eddy current loss. The insulating film also plays a role of applying electrical insulating properties, tensile strength, heat resistance, and the like to the steel shed. Furthermore, recently, there is also known a grain-oriented electrical steel sheet in which a glass film is formed between the steel sheet and the insulating film.

On the other hand, as a method of reducing the anomalous eddy current loss, there is known a magnetic domain control method of narrowing a width of a 180° magnetic domain (performing refinement of the 180° magnetic domain) by forming a strain, which extends in a direction intersecting the rolling direction, at a predetermined interval along the rolling direction. The magnetic domain control method is classified into a non-destructive magnetic domain control method in which the strain is applied to the steel sheet of the grain-oriented electrical steel sheet by non-destructive means, and a destructive magnetic domain control method in which a groove is formed in a surface of the steel sheet as an example.

In a case of manufacturing a wound core for a transformer by using the grain-oriented electrical steel sheet, it is necessary to perform a stress relief annealing treatment so as to remove a deformation strain that occurs when the grain-oriented electrical steel sheet is coiled in a coil shape. In a case of manufacturing the wound core by using a grain-oriented electrical steel sheet to which a strain is applied by using the non-destructive magnetic domain control method, the strain is disappeared due to execution of the stress relief annealing treatment. Therefore, a magnetic domain refinement effect (that is, an anomalous eddy current loss reducing effect) is also lost.

On the other hand, in a case of manufacturing the wound core by using a grain-oriented electrical steel sheet to which a groove is allied in accordance with the destructive magnetic domain control method, since the groove is not lost due to execution of the stress relief annealing treatment, it is possible to maintain the magnetic domain refinement effect. Accordingly, as a method of reducing the anomalous eddy current loss, the destructive magnetic domain control method is typically employed with respect to the wound core.

For example, as disclosed in Patent Document 1, a method of applying a strain to a steel sheet through laser irradiation is put into practical use. On the other hand, when forming a groove having a depth of approximately 10 to 30 μm in a direction, which is approximately perpendicular to a rolling direction of the grain-oriented electrical steel sheet, in a constant period in the rolling direction, the iron loss is reduced. The reason for this is as follows. A magnetic pole occurs at the periphery of the groove due to a variation of permeability in a void of the groove, and an interval of a 180° magnetic wall is narrowed due to the magnetic pole. As a result, the iron loss is improved.

Examples of a method of forming the groove in the electrical steel sheet include an electrolytic etching method in which a groove is formed in a steel sheet surface of the grain-oriented electrical steel sheet through the electrolytic etching method (refer to Patent Document 2), a gear press method in which a groove is formed in a steel sheet surface by mechanically pressing a gear on the steel sheet surface of the grain-oriented electrical steel sheet (refer to Patent Document 3), and a laser irradiation method in which the steel sheet (portion irradiated with a laser) is melted and evaporated through laser irradiation (refer to Patent Document 4).

PRIOR ART DOCUMENT

Patent Document

[Patent Document 1] Japanese Examined Patent Application, Second Publication No. S58-26406

[Patent Document 2] Japanese Examined Patent Application, Second Publication No. S62-54873

[Patent Document 3] Japanese Examined Patent Application, Second Publication No. S62-53579

[Patent Document 4] Japanese Unexamined Patent Application, First Publication No. 2003-129135

DISCLOSURE OF THE INVENTION

Problems to be Solved by the Invention

When forming a groove for magnetic domain refinement in a direction that intersects the rolling direction, it is necessary to make a groove forming speed be fast or to make a abort threading speed of the steel sheet be slow so as to form one groove in a region ranging from an edge on one side of the steel shed that travels along one direction to an edge on the other side. However, the upper limit of the groove forming speed exists from a technical viewpoint, and the lower limit of the sheet threading speed of the steel sheet also exists from the viewpoint of industrial production. Therefore, a plurality of grooves may be formed in a region ranging from an edge on one side of the steel sheet that travels along one direction to an edge on die other side by using a plurality of groove forming apparatuses. However, in a case of forming the plurality of grooves in a region ranging from the edge on one side of the steel sheet to the edge on the other side, there is a problem that iron loss characteristics of a grain-oriented electrical steel sheet is not stably improved.

The invention has been made in consideration of the above-described problems, and an object thereof is to provide a gram-oriented electrical steel sheet that is excellent in industrial productivity and is capable of improving an iron loss.

Means for Solving the Problem

The invention employs the following aspects to solve the above-described problem and to accomplish the object.

(1) According to a first aspect of the invention, there is provided a grain-oriented electrical steel sheet including a steel sheet having a steel sheet surface in which a groove, which extends in a direction intersecting a rolling direction and of which a groove depth direction matches a sheet thickness direction, is formed. In a case where the steel sheet surface is seen from the sheet thickness direction, the steel sheet surface is provided with a groove group that is constituted by a plurality of the grooves arranged in a sheet width direction, the grooves, which constitute the groove group, are arranged in such a manner that adjacent grooves overlap each other on a projection plane perpendicular to the rolling direction, and a plurality of the groove groups are arranged with an interval in the rolling direction.

In the grain-oriented electrical steel sheet, when an end of the steel sheet in the sheet width direction is set as a reference end, grooves adjacent to each other among the plurality of grooves of each of the groove groups are set as a first groove and a second groove in an order close to the reference end, two groove ends of each of the grooves, which constitute the groove group, in a longitudinal groove direction are set as a first groove end and a second groove end in an order close to the reference end, a contour of the first groove that is projected onto the projection plane is set as a first longitudinal groove projection line, a contour of the second groove that is projected onto the projection plane is set as a second longitudinal groove projection line, an average depth in the contours of the plurality of grooves which constitute the groove group is set as an average groove group depth $D_A$ in a unit of μm, at the first groove end of the second longitudinal groove projection line, a point on the second longitudinal groove projection line, at which a depth from the steel sheet surface in the sheet thickness direction becomes $0.05 \times D_A$, is set as a first point and at the second groove end of the first longitudinal groove projection line, a point on the first longitudinal groove projection line, at which a depth from the steel sheet surface in the sheet thickness direction becomes $0.05 \times D_A$, is set as a second point on the projection plane, a distance between the first point on the second longitudinal groove projection line and the reference end is shorter than a distance between the second point on the first longitudinal groove projection line and the reference end, and in an overlapping region between the first groove end of the second groove and the second groove end of the first groove, a total depth of a depth from the steel sheet surface in the sheet thickness direction at the second groove end of the first groove and a depth from the steel sheet surface in the sheet thickness direction at the first groove end of the second groove is $0.5 \times D_A$ or greater.

(2) In the grain-oriented electrical steel sheet according to (1), when an arbitrary point on the first longitudinal groove projection line, which is included in the overlapping region, is set as P1, and among points on the second longitudinal groove projection line that is included in the overlapping region, a point, at which a distance from the reference end is the same as a distance between the point P1 and the reference end, is set as P2, in the overlapping region, a total depth of a depth of the first groove from the steel sheet surface to the point P1 on the first longitudinal groove projection line in the sheet thickness direction, and a depth of the second groove from the steel sheet surface to the point P2 on the second longitudinal groove projection line in the sheet thickness direction may be $0.5 \times D_A$ or greater.

(3) According to a second aspect of the invention, there is provided a grain-oriented electrical steel sheet including a steel sheet having a steel sheet surface in which a groove, which extends in a direction intersecting a rolling direction and of which a groove depth direction matches a sheet thickness direction, is formed. In a case where the steel sheet surface is seen from the sheet thickness direction, the steel sheet surface is provided with a groove group that is constituted by a plurality of the grooves arranged in a sheet width direction, the grooves, which constitute the groove group, are arranged in such a manner that adjacent grooves overlap each other on a projection plane perpendicular to the rolling direction, and a plurality of the groove groups are arranged with an interval in the rolling direction.

In the grain-oriented electrical steel sheet, when one end of the steel sheet in the sheet width direction is set as a reference end, grooves adjacent to each other among the plurality of grooves of each of the groove groups are set as a first groove and a second groove in an order close to the reference end, two groove ends of each of the grooves, which constitute the groove group, in a longitudinal groove direction are set as a first groove end and a second groove end in an order close to the reference end, a contour of the first groove that is projected onto the projection plane is set as a first longitudinal groove projection line, a contour of the second groove that is projected onto the projection plane is set as a second longitudinal groove projection line, an average value of depths of the first longitudinal groove projection line from the steel sheet surface in the sheet thickness direction is set as a first average groove depth $D_I$ in a unit of μm, an average value of depths of the second longitudinal groove projection line from the steel sheet surface in the sheet thickness direction is set as a second average groove depth $D_{II}$ in a unit of μm, at the first groove end of the second longitudinal groove projection line, a point, at which a depth from the steel sheet surface in the sheet thickness direction becomes $0.05 \times D_{II}$, is set as a third point, and at the second groove end of the first longitudinal groove projection line, a point, at which a depth from the steel sheet surface in the sheet thickness direction becomes $0.05 \times D_I$, is set as a fourth point, on the projection plane, a distance La between the third point on the second longitudinal groove projection line and the reference end is shorter than a distance Lb between the fourth point on the first longitudinal groove projection line and the reference end, and in an overlapping region between the first groove end of the second groove and the second groove end of the first groove, a total depth of a depth from the steel sheet surface in the sheet thickness direction at the first groove and a depth from the steel sheet surface in the sheet thickness direction at the second groove is $0.25 \times (D_I + D_{II})$ or greater.

(4) In the grain-oriented electrical steel sheet according to (3), when at the second groove end of the first longitudinal groove projection line, a point, at which a depth from the steel sheet surface in the sheet thickness direction becomes $0.95 \times D_I$, is set as a fifth point and at the first groove end of the second longitudinal groove projection line, a point, at which a depth from the steel sheet surface in the sheet thickness direction becomes $0.95 \times D_{II}$, is set as a sixth point, a distance Lc between the fifth point on the first longitudinal groove projection line and the reference end may be shorter than a distance Ld between the sixth point on the second longitudinal groove projection line and the reference end.

(5) In the grain-oriented electrical steel sheet according to any one of (1) to (4), in the steel sheet, a grain size of a crystal grain, which is in contact with the groove, may be 5 µm or greater.

Effects of the Invention

According to the aspects of the invention, it is possible to provide a grain-oriented electrical steel sheet that is excellent in an iron loss.

EMBODIMENTS OF THE INVENTION

Hereinafter, a preferred embodiment of the invention will be described in detail with reference to the accompanying drawings. However, the invention is not limited to configurations disclosed in this embodiment and various modifications can be made in a range not departing from the gist of the invention. In addition, the lower limit and the upper limit are also included in numerical value limiting ranges to be described later. However, the lower limit is not included in a numerical value limiting range that is described as "greater than" the lower limit, and the upper limit is not included in a numerical value limiting range that is described as "less than" the upper limit.

Figure 1:
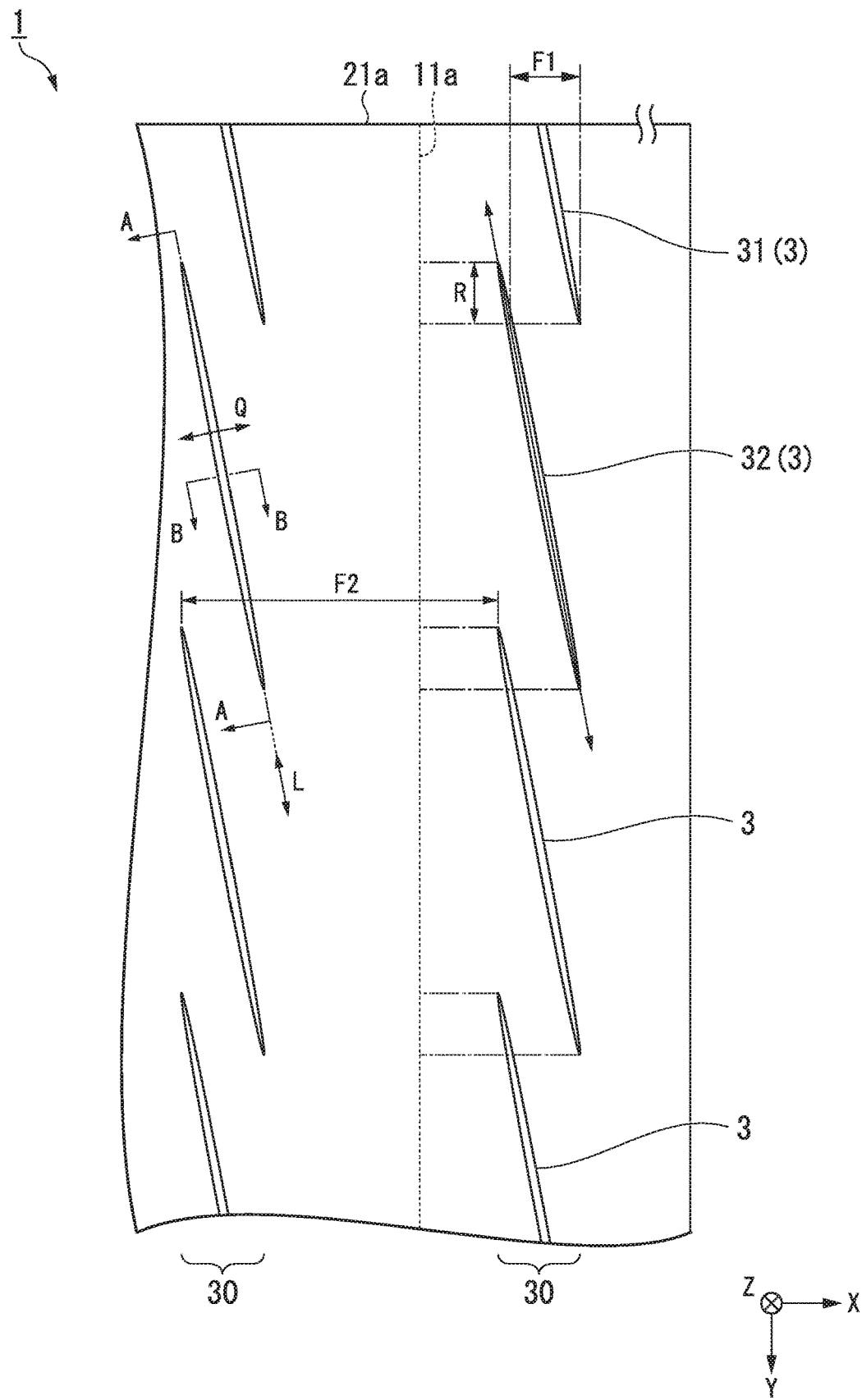
FIG. 1 is a schematic view illustrating a groove that is formed in a steel sheet surface of a grain-oriented electrical steel sheet according to an embodiment of the invention.
Figure 2:
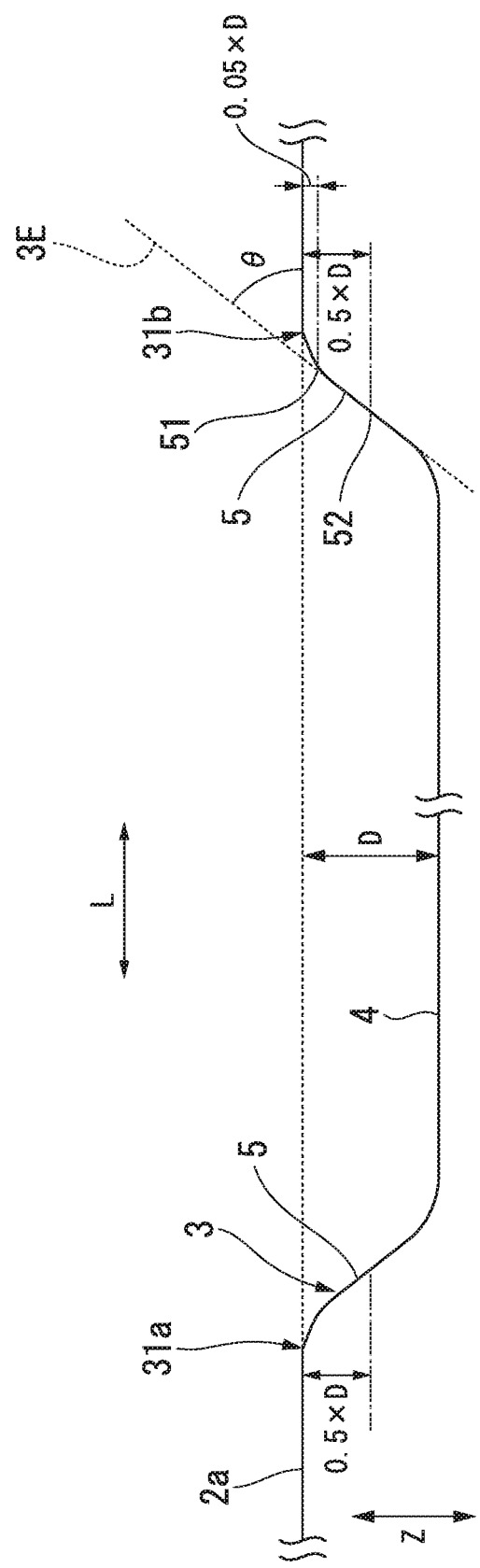
FIG. 2 is a view illustrating a cross-sectional shape of the groove along line A-A in FIG. 1.
Figure 3:
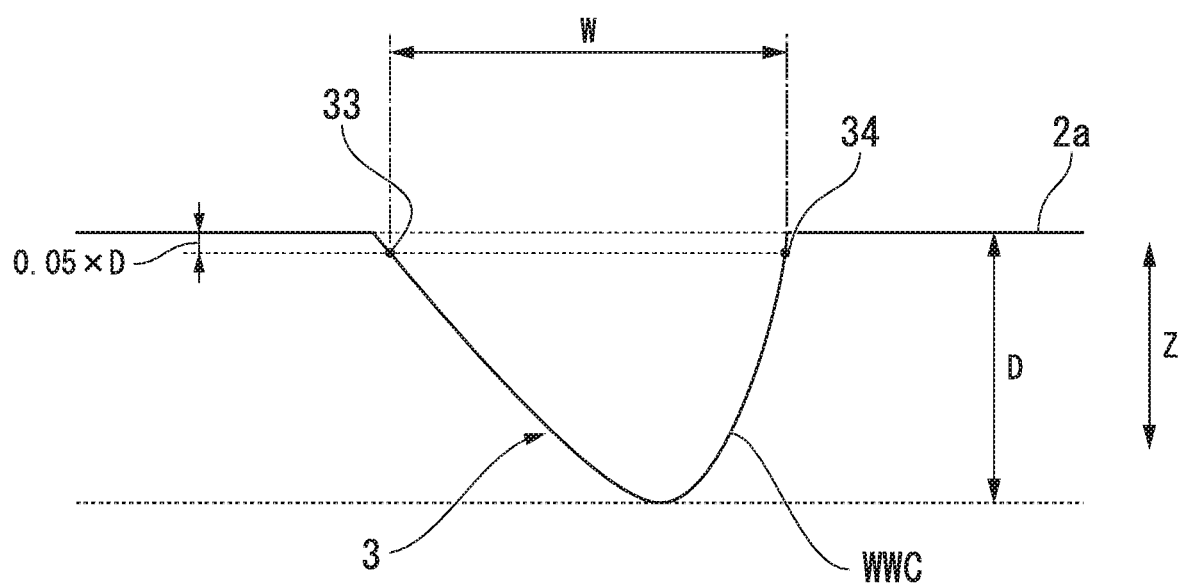
FIG. 3 is a view illustrating a cross-sectional shape of the groove along line B-B in FIG. 1.

FIG. 1 is a plan view of a grain-oriented electrical steel sheet 1 according to this embodiment. FIG. 2 is an arrow cross-sectional view taken along line A-A in FIG. 1. FIG. 3 is an arrow cross-sectional view taken along line B-B in FIG. 1. Furthermore, in the drawings, a rolling direction of the grain-oriented electrical steel sheet 1 is defined as X, a sheet width direction (direction perpendicular to the rolling direction in the same plane) of the grain-oriented electrical steel sheet 1 is defined as Y, and a sheet thickness direction (direction perpendicular to an XY plane) of the grain-oriented electrical steel sheet 1 is defined as Z. The grain-oriented electrical steel sheet 1 according to this embodiment includes a groove 3 for magnetic domain refinement in a steel sheet surface 2a. FIG. 1 is a schematic view illustrating a groove 3 when the grain-oriented electrical steel sheet 1 according to this embodiment is seen from the sheet thickness direction Z (hereinafter, may be described as "in a plan view").

As illustrated in FIG. 1, in a case where the groove 3 is seen from the sheet thickness direction Z (in a case of a plan view of the groove 3), an extension direction (an arrow L illustrated in FIG. 1) of the groove 3 is set as a longitudinal groove direction L. In a plan view of the groove 3, a direction (an arrow Q illustrated in FIG. 1) that is perpendicular to the longitudinal groove direction L of the groove 3 is set as a groove width direction Q. Actually, in steel shed surface 2a and the groove 3 of an actual grain-oriented electrical steel sheet, a surface thereof is not uniformly formed, but in FIG. 1 to FIG. 3, FIG. 5 to FIG. 8, and FIG. 18 to FIG. 20, the steel sheet surface 2a and the groove 3 are schematically illustrated for explanation of characteristics of the invention. In addition, the groove 3 may have an arc shape when being seen from the sheet thickness direction Z (in a case of a plan view of the groove 3). In this embodiment, the groove 3 having a linear shape is exemplified for convenience of explanation.

The grain-oriented electrical steel sheet 1 includes a steel sheet (base metal) 2 in which a crystal orientation is controlled by a combination of a cold-rolling treatment and an annealing treatment so that a magnetization easy axis of a crystal grain and the rolling direction X match each other, and the groove 3 is provided in a surface (steel sheet surface 2a) of the steel sheet 2.

The steel sheet 2 contains, as chemical components in terms of mass fraction, Si: 0.8% to 7%, C: greater than 0% and equal to or less than 0.085%, acid-soluble Al: 0% to 0.065%, N: 0% to 0.012%, Mn: 0% to 1%, Cr: 0% to 0.3%, Cu: 0% to 0.4%, P: 0% to 0.5% Sn; 0% to 0.3% Sb: 0% to 0.3%, Ni: 0% to 1%, S: 0% to 0.015% Se: 0% to 0.015%, and the remainder including Fe and unavoidable impurities.

The chemical components of the steel sheet 2 are chemical components which are preferable after a crystal orientation is integrated to a {110} <001> orientation, that is, after a control to a Goss texture. Among the elements, Si and C are basic elements, and acid-soluble Al, N, Mn, Cr, Cu, P, Sn, Sb, Ni, S, and Se are selective elements. The selective elements may be contained in correspondence with the purpose thereof. Accordingly, it is not necessary to limit the lower limit, and the lower limit may be 0%. In addition, the effect of this embodiment does not deteriorate even when the selective elements are contained as impurities. In the steel sheet 2, the remainder of the basic elements and the selective elements may be composed of Fe and impurities. In addition, the impurities represent elements which are unavoidably mixed in due to ore and scrap as a raw material, or a manufacturing environment and the like when industrially manufacturing the steel sheet 2.

In addition, an electrical steel sheet is typically subjected to purification annealing during secondary recrystal ligation. Discharge of an inhibitor forming element to the outside of a system occurs in the purification annealing. Particularly, a decrease in a concentration significantly occurs with respect to N and S, and the concentration becomes 50 ppm or less. Under typical purification annealing conditions, the concentration becomes 9 ppm or less, or 6 ppm or less. If the purification annealing is sufficiently performed, the concentration reaches to a certain extent (1 ppm or less) at which detection is impossible in typical analysis.

The chemical component of the sleet sheet 2 may be measured in accordance with a typical steel analysis method. For example, the chemical components of the steel sheet 2 may be measured by using inductively coupled plasma-atomic emission spectrometry (ICP-AES). Specifically, it is possible to specify the chemical components by performing measurement for a test piece of 35 mm square, which is obtained from the central position of the steel sheet 2 after film removal, by using an ICP emission analyzing apparatus (for example, ICPS-8100, manufactured by Shimadzu Corporation) under conditions based on a calibration curve that is created in advance. Furthermore, C and S may be measured by using a combustion-infrared ray absorption method, and N may be measured by using inert gas fusion-thermal conductivity method.

The grain-oriented electrical steel sheet 1 according to this embodiment may include an insulating film (not illustrated) on the groove 3 and the steel sheet surface 2a.

In addition, a glass film (not illustrated) may be provided between the steel sheet surface 2a and the insulating film. For example, the glass film is constituted by a composite oxide such as forsterite ($Mg_2SiO_4$), spinel ($MgAl_2O_4$), and cordierite ($Mg_2Al_4Si_2O_{16}$). Although details will be described later, the glass film is a film that is formed to prevent adhering to the steel sheet 2 in a final annealing process that is one of manufacturing processes of the grain-oriented electrical steel sheet 1. Accordingly, the glass film is not an essential element among constituent elements of the grain-oriented electrical steel sheet 1. For example, the insulating film contains colloidal silica and phosphate, and plays a role of applying electrical insulating properties, a tensile force, corrosion resistance, heat resistance, and the like to the steel sheet 2.

Furthermore, for example, the glass film and the insulating film of the grain-oriented electrical steel sheet 1 can be removed by the following method. The grain-oriented electrical steel sheet 1 including glass film or the insulating film is immersed in an aqueous sodium hydroxide solution containing 10 mass % of NaOH and 90 mass % of $H_2O$ at 80° C. for 15 minutes. Then, the grain-oriented electrical steel sheet 1 is immersed in an aqueous sulfuric acid solution containing 10 mass % of $H_2SO_4$ and 90 mass % of $H_2O$ al 80° C. for 3 minutes. Then, the grain-oriented electrical steel sheet 1 is immersed in an aqueous nitric acid solution containing 10 mass % of $HNO_3$ and 90 mass % of $H_2O$ at room temperature for a time period that is slightly shorter than 1 minute, and is washed. Finally, the grain-oriented electrical steel sheet 1 is dried by using a warm wind blower for a time period that is slightly shorter than 1 minute. Furthermore, in a case where the glass film or the insulating film is removed from the grain-oriented electrical steel sheet 1 according to the above-described method, it is confirmed that a shape or roughness of the groove 3 of the steel sheet 2 is approximately the same as a shape or roughness before forming the glass film or the insulating film.

As illustrated in FIG. 1, the groove 3 is formed in such a manner that the groove 3 extends in a direction that intersects the rolling direction X and a depth direction matches the sheet thickness direction Z. In a case where the steel sheet surface 2a is seen from the sheet thickness direction Z, the grain-oriented electrical steel sheet 1 includes a groove group 30 that is constituted by a plurality of the grooves 3 arranged in the sheet width direction Y. When seen on a projection plane (cross-section indicated by a broken line 11a in FIG. 1) that is perpendicular to the rolling direction X, the grooves 3, which constitute the groove group 30, are arranged in such a manner that adjacent groove overlap each other.

According to this configuration, in the grain-oriented electrical steel sheet 1, in a case of forming the plurality of grooves 3 in the sheet width direction Y, it is possible to secure a state in which the grooves 3 are formed in the sheet width direction Y. As a result, it is possible to improve an iron loss.

When one end of the steel sheet in the sheet width direction Y is set as a reference end 21a, the plurality of grooves 3, which constitute the groove group 30, are formed as a first groove 31, a second groove 32, and an $n^{th}$ groove $3n$ in an order close to the reference end 21a. As illustrated in FIG. 1, the first groove 31, the second groove 32, and the $n^{th}$ groove $3n$ are arranged in such a manner that ends of the grooves 3, which are adjacent to each other on a projection plane perpendicular to the rolling direction X, overlap each other.

In addition, as illustrated in FIG. 1, it is preferable that the groove group 30 is arranged to be spaced away from another groove group 30 in the rolling direction X.

As illustrated in FIG. 2, in each of the grooves 3, an inclined portion 5, which is inclined so that a depth becomes deeper as it goes from the steel sheet surface 2a toward the bottom 4 of the groove 3, is formed at both ends in the longitudinal groove direction L. As described above, in a case where the inclined portion 5 is provided at the both ends in the longitudinal groove direction L, when the grooves 3 are arranged in such a manner that ends of the grooves 3 adjacent to each other overlap each other as described below, it is possible to effectively improve the iron loss.

Terminologies in the following description will be defined.

(Average Groove Depth D)

The depth of the groove 3 represents a length from the height of the steel sheet surface 2a to a surface (bottom 4) of the groove 3 in the sheet thickness direction Z. The average groove depth D may be measured as follows. In a case where the groove 3 is seen from the sheet thickness direction Z (in a case of a plan view of the groove 3), an observation range is set to a part of the groove 3. It is preferable that the observation range is set to a region excluding an end in the longitudinal groove direction L of the groove 3 (that is, a region in which a shape of the groove bottom is stable). For example, the observation range may be an observation region of which a length in the longitudinal groove direction L becomes approximately 30 µm to 300 µm at an approximately central portion in the longitudinal groove direction L. Next, a height distribution (groove depth distribution) in the observation range is obtained by using a laser microscope and the maximum groove depth is obtained in the observation range. The same measurement is performed at least at three or greater regions, and preferably 10 regions while changing the observation range. In addition, an average value of the maximum groove depth al the respective observation regions is calculated, and the average value is defined as an average groove depth D. For example, the average groove depth D of the groove 3 in this embodiment is preferably 5 µm to 100 µm, and more preferably greater than 10 µm and equal to or less than 40 µm so as to preferably obtain an effect of the magnetic domain refinement.

Furthermore, it is necessary to measure a position (height) of the steel sheet surface 2a in the sheet thickness direction Z in advance so as to measure a distance between the steel sheet surface 2a and the surface of the groove 3. For example, the position (height) in the sheet thickness direction Z is measured with respect to a plurality of sites on the steel shed surface 2a in each of the observation ranges by using a laser microscope, and an average value of the measurement results may be used as the height of the steel sheet surface 2a. In addition, in this embodiment, when measuring an average groove width W as described later, a transverse groove cross-section is used. Accordingly, the steel sheet surface 2a may be measured from the transverse groove cross-section. Furthermore, when observing a steel sheet sample with a laser microscope, it is preferable that two sheet surfaces (an observation surface and a rear surface thereof) of the steel sheet sample are approximately parallel to each other.

(Average Groove Width W)

The width of the groove 3 represents a length of a groove opening in the transverse groove direction Q in a case where the groove 3 is seen on a cross-section (a groove-width-direction cross-section or a transverse groove cross-section) that is perpendicular to the longitudinal groove direction L. The average groove width W may be measured as follows. As is the case with the average groove depth D, an observation range is set to a part of the groove 3 in a case where the groove 3 is seen from the sheet thickness direction Z (in a case of a plan view of the groove 3). It is preferable that the observation range is set to a region excluding an end in the longitudinal groove direction L of the groove 3 (that is, a region in which a shape of the groove bottom is stable).

For example, the observation range may be an observation region of which a length in the longitudinal groove direction L becomes approximately 30 µm to 300 µm at an approximately central portion in the longitudinal groove direction L. Next, a transverse groove cross-section that is perpendicular to the longitudinal groove direction L is obtained at arbitrary one site in the observation range (for example, a position of the maximum groove depth in the observation region) by using a laser microscope. A length of the groove opening is obtained from a contour curve of the steel sheet surface 2a and the groove 3 on the transverse groove cross-section.

Specifically, after obtaining a cross-section curve by applying a low-pass filter (cut-off value: λs) to the steel sheet surface 2a and a measurement cross-section curve MCL mat constitutes a contour of the steel sheet surface 2a and the groove 3 that is shown on the transverse groove cross-section, when a band filter (cut-off value: λf, λc) is applied to the cross-section curve to remove long wavelength components and short wavelength components from the cross-section curve, as illustrated in FIG. 3, a waving curve WWC, which constitutes a contour of the groove 3 in the transverse groove cross-section, is obtained. The waving curve is one kind of contour curve that is suitable to simplify the shape of the contour to a smooth line.

As illustrated in FIG. 3, a length (groove opening) $W_n$ of a line segment, which connects two points (a third point 33 and a fourth point 34) at which the depth from the steel sheet surface 2a to the surface of the groove 3 along the sheet thickness direction Z becomes 0.05×D with respect to the average groove depth D of the groove 3, is obtained on the waving curve WWC of the groove 3 at the transverse groove cross-section.

The same measurement is performed at least at three regions or greater regions and preferably 10 regions while changing the observation range. In addition, an average value of the groove opening at the respective observation regions is calculated, and the average value is defined as an average groove width W. For example, it is preferable that the average groove width W of the groove 3 in this embodiment is 10 µm to 250 µm so as to preferably obtain the effect of the magnetic domain refinement.

Furthermore, it is necessary to measure a position (height) of the steel sheet surface 2a in the sheet thickness direction Z in advance so as to measure a depth, which becomes 0.05×D, from the steel sheet surface 2a. For example, the position (height) in the sheet thickness direction Z is measured with respect to a plurality of sites on the steel sheet surface 2a on a waving curve in each transverse groove cross-section, and an average value of the measurement results may be used as the height of the steel sheet surface 2a.

(First Angle θ)

Figure 4:
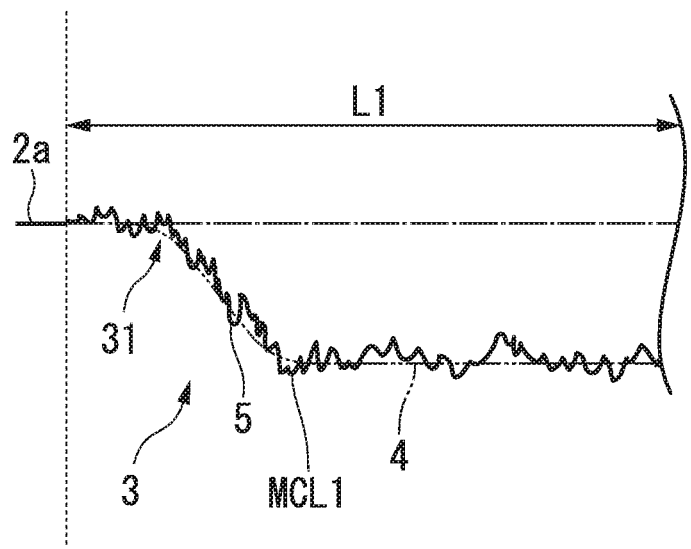
FIG. 4 is a view illustrating definition of a contour of the groove.

The first angle θ of the groove 3 represents an angle made by the steel sheet surface 2a and the end of the groove 3. The first angle θ may be measured as follows. In a case where the groove 3 is seen from the sheet thickness direction Z (in a case of a plan view of the groove 3), an observation range is set to a part of the groove 3 which includes an end in the longitudinal groove direction L. In a plan view of the groove 3 from the sheet thickness direction Z, a plurality of (n) virtual lines $L_1$ to $L_n$ are virtually set in the observation range along the longitudinal groove direction L (refer to FIG. 6). It is preferable that the observation range is set to a region including the end of the groove 3 (that is, a region ranging from a starting point of the groove 3 in the longitudinal groove direction L to a region in which a shape of the groove bottom is stable). Next, when measuring a height distribution (groove depth distribution) of the groove 3 in the observation range along the virtual line $L_1$ by using a laser microscope (a laser type surface roughness measuring device), as illustrated in FIG. 4, a measurement cross-section curve MCL 1, which constitutes a contour of the end of the groove 3 in the longitudinal groove direction L, is obtained in a shape conforming to the virtual line L1.

Figure 5:
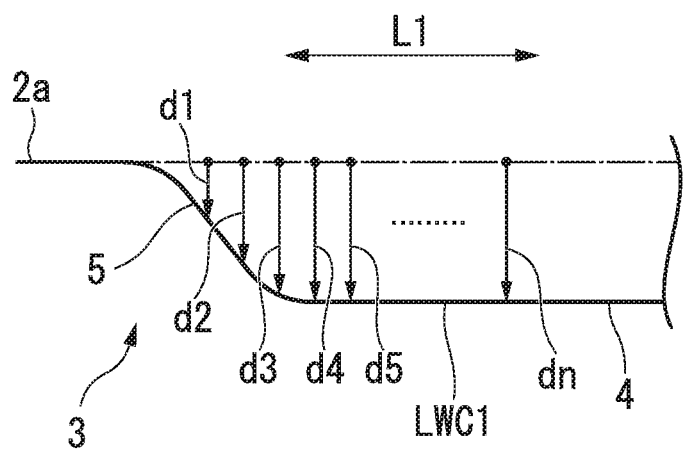
FIG. 5 is a view illustrating definition of the contour of the groove.

After obtaining a cross-section curve by applying a low-pass filter (cut-off value: λs) to the measurement cross-section curve MCL1 obtained with respect to the virtual line L1, when a band filter (cut-off value: λf, λc) is applied to the cross-section curve to remove long wavelength components and short wavelength components from the cross-section curve, as illustrated in FIG. 5, a waving curve LWC1, which constitutes a contour of the end of the groove 3 in the longitudinal groove direction L, is obtained in a shape conforming to the virtual line L1.

As illustrated in FIG. 5, when using the waving curve LWC1, distances (depths d1 to dn: unit is μm) in the sheet thickness direction Z between the steel sheet surface 2a and the contour (that is, the waving curve LWC1) of the groove 3 are obtained at a plurality of (n) positions along the virtual line L1. In addition, an average value (groove depth D1) of the depths d1 to dn is obtained. Groove depths D2 to Dn of the groove end are also obtained with respect to other virtual lines L2 to Ln according to the same measurement method.

Furthermore, it is necessary to measure a position (height) of the steel sheet surface 2a in the sheet thickness direction Z in advance so as to measure the depths d1 to dn from the steel sheet surface 2a. For example, the position (height) in the sheet thickness direction Z may be measured with respect to a plurality of sites on the steel sheet surface 2a in the measurement range by using the laser microscope, and an average value of the measurement results may be used as the height of the steel sheet surface 2a.

Figure 6:
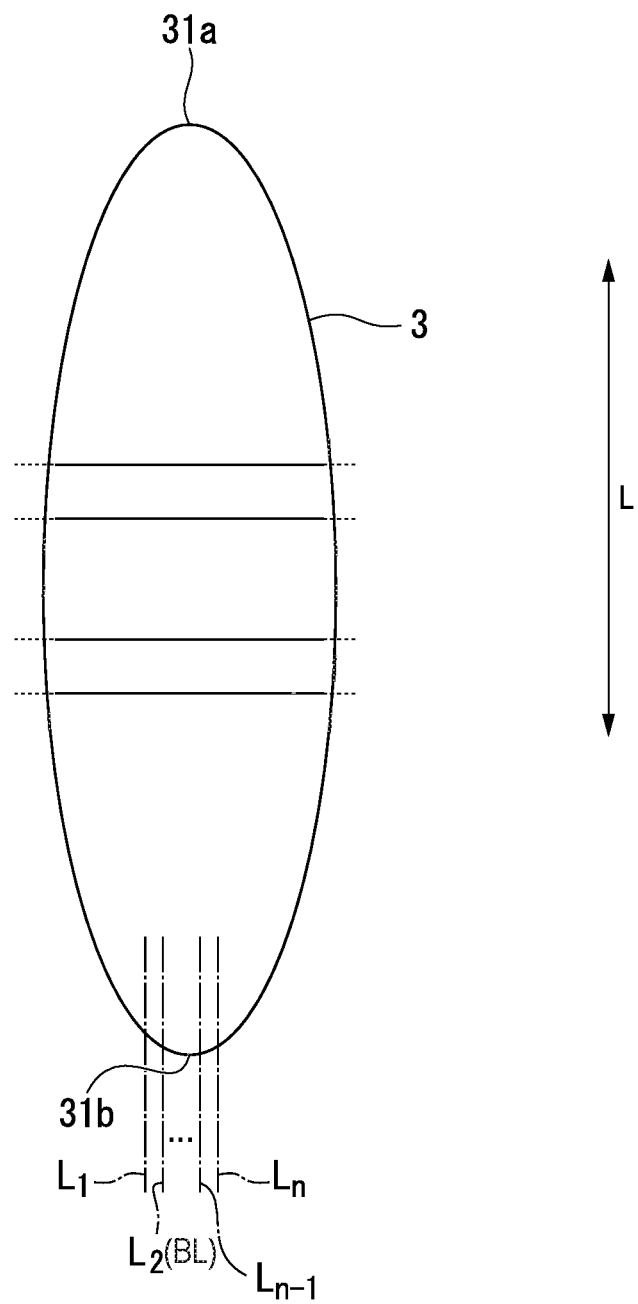
FIG. 6 is a view illustrating definition of a first angle.

In this embodiment, among the virtual line L1 to Ln, a virtual line, which conforms to the longitudinal groove direction L and satisfies a condition in which the average depth of the groove becomes the maximum, is selected as a groove reference line BL. For example, as illustrated in FIG. 6, among the groove depths D1 to Dn obtained with respect to the virtual lines L1 to Ln, the groove depth D2 is the maximum, the virtual line L2 is defined as the groove reference line BL.

Figure 7:
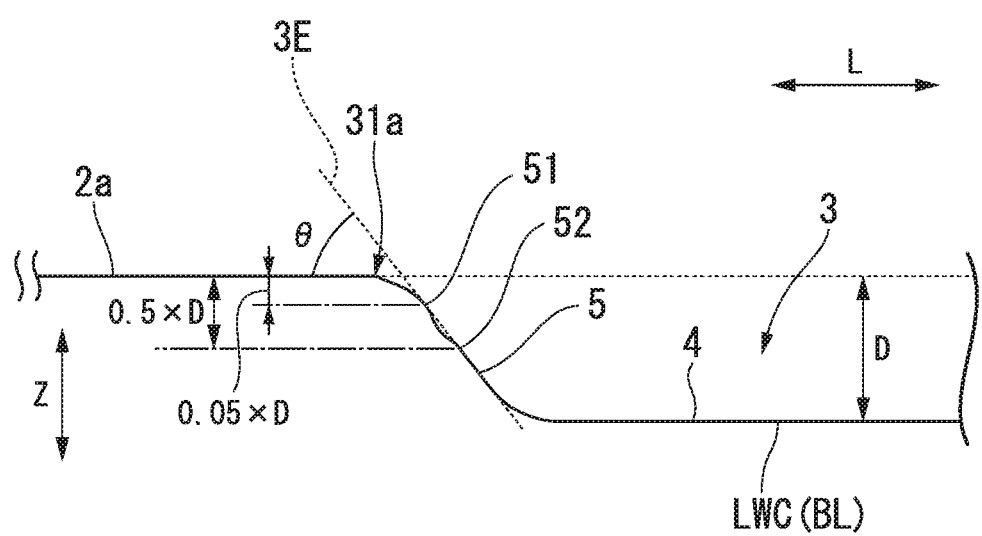
FIG. 7 is a view illustrating definition of the first angle.

As illustrated in FIG. 7, on a waving curve shape based on the groove reference line BL, a straight line, which connects a first point 51 at which the depth from the steel sheet surface 2a in the sheet thickness direction Z becomes 0.05×D, and a second point 52 at which the depth from the steel sheet surface 2a in the sheet thickness direction Z becomes 0.50×D, is set as a groove end straight line 3E. In addition, the first angle θ of the groove 3 is defined as an inclination angle of the groove end straight line 3E with respect to the steel sheet surface 2a.

Furthermore, it is necessary to subject the steel sheet surface 2a to linear approximation so as to measure the first angle θ.

For example, on a waving curve shape based on the groove reference line BL, only a region of the steel sheet surface 2a except for the groove 3 may be subjected to the linear approximation. An inclination angle between the steel sheet surface 2a subjected to the linear approximation and the groove end straight line 3E may be measured. An inclination angle (first angle θ) made by the groove end straight line 3E and the steel sheet surface 2a is obtained at both ends of the groove 3 in the longitudinal groove direction L by the same method.

(Longitudinal Groove Projection Line LWP)

Figure 8:
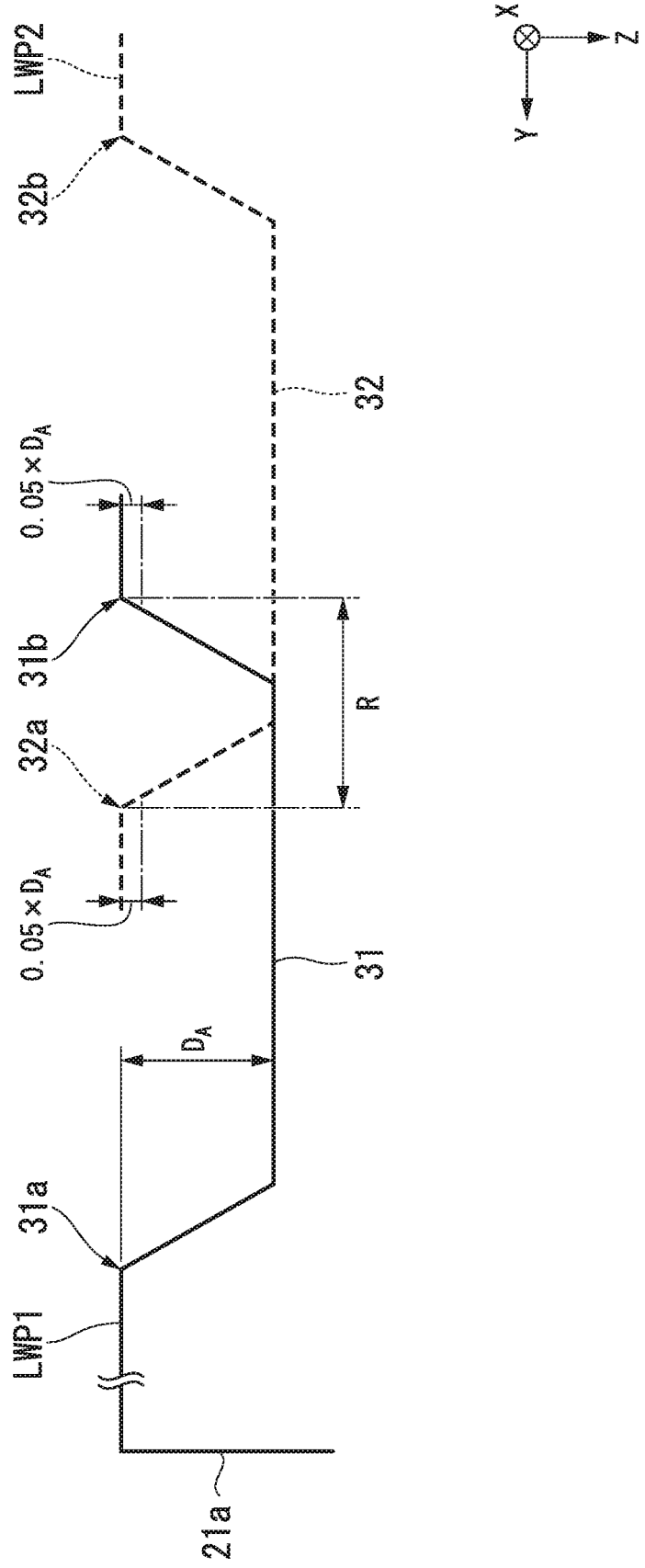
FIG. 8 is a view illustrating a longitudinal groove projection line of adjacent grooves of the grain-oriented electrical steel sheet according to this embodiment.

In a case where a surface perpendicular to the rolling direction X is set as a projection plane, and a contour of the groove 3 in the longitudinal groove direction L is projected onto the projection plane, a contour, which is projected onto the projection plane, in the longitudinal groove direction L, is defined as a longitudinal groove projection line LWP. The longitudinal groove projection line LWP may be measured as follows. In a plan view of the groove 3 from the sheet thickness direction Z, the observation range is set to a region including the entirety of the groove 3 or a region including an end of the groove 3 (that is, region ranging from a starting point of the groove 3 in the longitudinal groove direction L to a region in which a shape of the groove bottom is stable). A plurality of virtual lines along the longitudinal groove direction L are virtually set in the observation range. It is assumed that virtual lines $L_1$ to $L_n$ can be set at an arbitrary height in the sheet thickness direction Z. In addition, a virtual line at which the groove depth becomes the maximum is selected by the same method as the method described with regard to the groove reference line BL. A curve, which is obtained when projecting a groove depth distribution along the selected virtual line onto the projection plane as the entirely of a contour (waving curve) of the groove 3 in the longitudinal groove direction L, is set as the longitudinal groove projection line LWP. Furthermore, it is preferable that the observation range is set to a region including the entirety of two adjacent grooves, or a region including an end at which two adjacent grooves overlap each other (that is, a region including a region in which a groove bottom shape of one groove is stable, a region in which groove ends of two adjacent grooves overlap each other, and a region in which a groove bottom shape of the other groove is stable). Two groove ends of grooves, which constitute the groove group 30, in the longitudinal groove direction L are set as a first groove end and a second groove end in the order close to the reference end 21a. FIG. 8 schematically illustrates a first groove end 31a and a second groove end 31b of a first longitudinal groove projection line LWP1 of the first groove 31, and a first groove end 32a and a second groove end 32b of a second longitudinal groove projection line LWP2 of the second groove 32. In addition, in FIG. 8, only two grooves 31 and 32 adjacent to each other in the sheet width direction Y are extracted among the plurality of grooves 3 of the grain-oriented electrical steel sheet 1 according to this embodiment, and are described for explanation of a positional relationship between adjacent grooves in the sheet width direction Y.

As illustrated in FIG. 1, in the grain-oriented electrical steel sheet 1 according to this embodiment, the second groove end 31b of the first groove 31 and the first groove end 32a of the second groove 32, which are adjacent to each other in the sheet width direction Y, are arranged to overlap each other in the sheet width direction Y. FIG. 8 exemplifies a disposition in which ends of the first groove 31 and the second groove 32, which are adjacent to each other in the sheet width direction Y, do not overlap each other when seen from the sheet thickness direction Z. However, ends of the first groove 31 and the second groove 32 may overlap each other when seen in the sheet thickness direction Z. For example, when ends of the first groove 31 and the second groove 32 completely overlap each other when seen in the sheet thickness direction Z, the first groove 31 and the second groove 32 may be regarded as one groove.

Adjacent grooves overlap each other in the sheet width direction Y in such a manner that a position of the first groove end 32a of the second groove 32 in the second longitudinal groove projection line LWP2 in the sheet width direction Y is located on a further reference end 21a side in comparison to a position of the second groove end 31b of the first groove 31 in the first longitudinal groove projection line LWP1 in the sheet width direction Y. As illustrated in FIG. 8, a region between the second groove end 31b of the first groove 31 and the first groove end 32a of the second groove 32 is a region R in which the first groove 31 and the second groove 32 overlap each other in the sheet width direction Y.

In the grain-oriented electrical steel sheet 1, a plurality of grooves are formed in the sheet width direction Y, and the grooves 31 and 32 adjacent to each other overlap each other. Accordingly, even when using the grooves 31, 32, . . . , 3n having the inclined portion 5, it is possible to suppress the iron loss to a low value. That is, even in the groove 3 in which an inclined portion is formed on both ends in the longitudinal groove direction L to improve the rust resistance, if a plurality of the grooves 3 are arranged in the sheet width direction Y, and both ends of adjacent grooves are arranged to overlap each other in the sheet width direction Y, it is possible to improve the iron loss similar to a case where one groove having a uniform depth is formed in the sheet width direction Y.

In the grain-oriented electrical steel sheet 1 according to this embodiment, when satisfying the following condition, it is possible to further improve the iron loss of the grain-oriented electrical steel sheet.

A spaced distance (distance F1 illustrated in FIG. 1) between the first groove 31 and the second groove 32, which are adjacent to each other in the sheet width direction Y, in the rolling direction X is set to be smaller than a spaced distance (distance F2 illustrated in FIG. 1) between the groove groups 30, which are adjacent to each other in the rolling direction X, in the rolling direction X. An average depth of a groove group, which is constituted by the plurality of grooves 31, 32, . . . , 3n provided in the sheet width direction Y, is set as $D_A$, in the second groove end 31b of the first longitudinal groove projection line LWP1, a position (a point on the first longitudinal groove projection line LWP1) at which a depth in the sheet thickness direction Z from the steel sheet surface 2a to a contour in the longitudinal groove direction L becomes $0.05 \times D_A$ is referred to as a 0.05 $D_A$ position (second point) of the second groove end 31b of the first groove 31. Similarly, in the first groove end 32a of the second longitudinal groove projection line LWP2, a position (a point on the second longitudinal groove projection line LWP2) at which a depth in the sheet thickness direction Z from the steel sheet surface 2a to a contour in the longitudinal groove direction L becomes $0.05 \times D_A$ is referred to as a 0.05 $D_A$ position (first point) of the first groove end 32a of the second groove 32. The first groove 31 and live second groove 32 are arranged in such a manner that a distance between the 0.05 $D_A$ position (the first point on the second longitudinal groove projection line LWP2) of the first groove end 32a of the second groove 32 and the reference end 21a of the steel sheet 2 is shorter than a distance between the 0.05 $D_A$ position (the second point on the first longitudinal groove projection line LWP1) of the second groove end 31b of the first groove 31 and the reference end 21a of the steel sheet 2. Even in the groove 3 in which the inclined portion 5 is disposed on both ends in the longitudinal groove direction L to improve the rust resistance, if a plurality of the grooves 3 are arranged in the sheet width direction Y, and both ends of the grooves 31 and 32, which are adjacent to each other, are arranged to overlap each other in the sheet width direction Y, even when the ends of the respective grooves 31, 32, . . . , 3n are shallow, it is possible to improve the iron loss similar to a case where one groove having a uniform depth is formed in the sheet width direction Y.

In addition, when satisfying the following condition, it is possible to further improve the iron loss of the grain-oriented electrical steel sheet 1.

Figure 9:
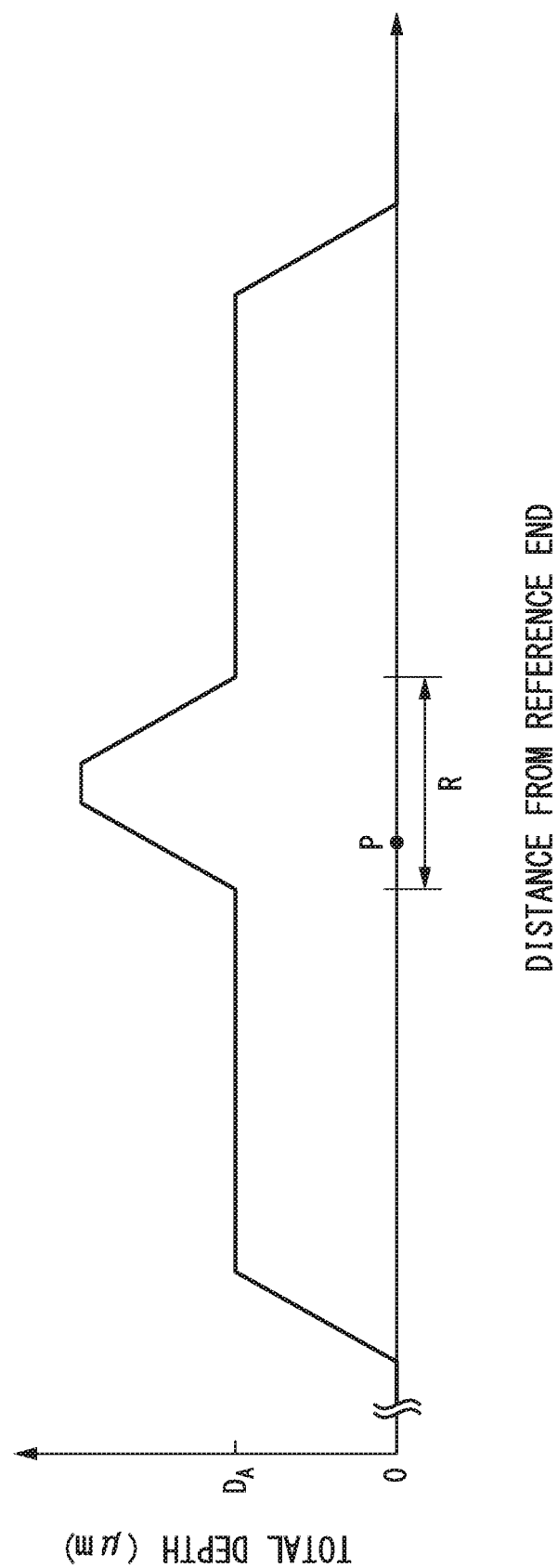
FIG. 9 is a graph illustrating a distribution of a total value of groove depths of adjacent grooves of the grain-oriented electrical steel sheet according to this embodiment.

An arbitrary point on the first longitudinal groove projection line LWP1, which is included in the overlapping region R between the first groove end 32a of the second groove 32 and the second groove end 31b of the first groove 31, is set as P1, and among points on the second longitudinal groove projection line LWP2 that is included in the overlapping region R, a point, at which a distance from the reference end 21a is the same as a distance between the point P1 and the reference end 21a (that is, a point at which a position in the sheet width direction Y is the same as in the point P1), is set as P2. In this embodiment, in the overlapping region R, a total depth of a depth of the first groove 31 from the steel sheet surface 2a to the point P1 on the first longitudinal groove projection line LWP1 in the sheet thickness direction Z, and a depth of the second groove 32 from the steel sheet surface 2a to the point P2 on the second longitudinal groove projection line LWP2 in the sheet thickness direction Z is $0.5 \times D_A$ or greater. That is, even when the points P1 and P2 exist at any position in the overlapping region R, the condition of "the total depth is $0.5 \times D_A$ or greater" is satisfied. As illustrated in FIG. 8 and FIG. 9, in the overlapping region R, the depth of the first groove 31 and the depth of me second groove 32 at the points P (P1, P2), at which distances from the reference end 21a are the same as each other, are added to each other. The grooves 3 are arranged in such a manner that a total value of the depth of the first groove 31 and the second groove 32 at the points P becomes $0.5 \times D_A$ or greater with respect to the average groove group depth $D_A$ of the plurality of grooves which are formed in the sheet width direction Y.

In FIG. 8, longitudinal groove projection lines, which are obtained by projecting contours in the longitudinal groove direction L onto the projection plane, are shown on the coordinates. FIG. 9 is a graph illustrating a relationship between a position of a region from the first groove end 31a of the first groove 31 and the second groove end 32b of the second groove 32 in the sheet width direction Y, and the total groove depth. The longitudinal groove projection lines are shown as a simplified straight line. The first groove 31 and the second groove 32 overlap each other from groove ends to the region of the bottom 4 described in the embodiment. According to this, as illustrated in FIG. 8, in the overlapping region R, the maximum value of the total groove depth of the first groove 31 and the second groove 32 becomes approximately two times the average groove group depth $D_A$ in the sheet width direction Y, and the minimum value of the total groove depth becomes approximately the same as the average groove group depth $D_A$ in the sheet width direction Y.

Figure 10:
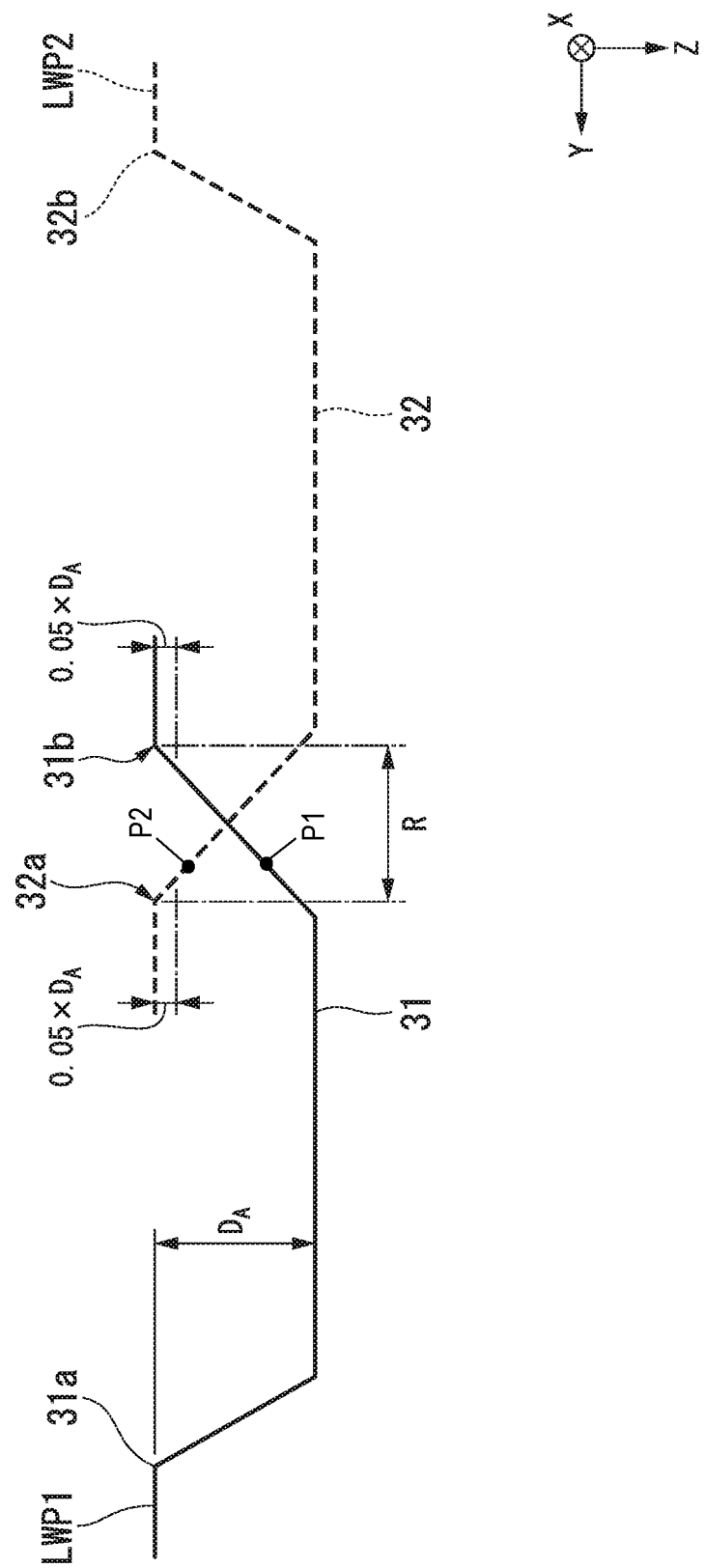
FIG. 10 is a view illustrating a longitudinal groove projection line of adjacent grooves in a case where a width of an overlapping region is different in comparison to FIG. 8.
Figure 11:
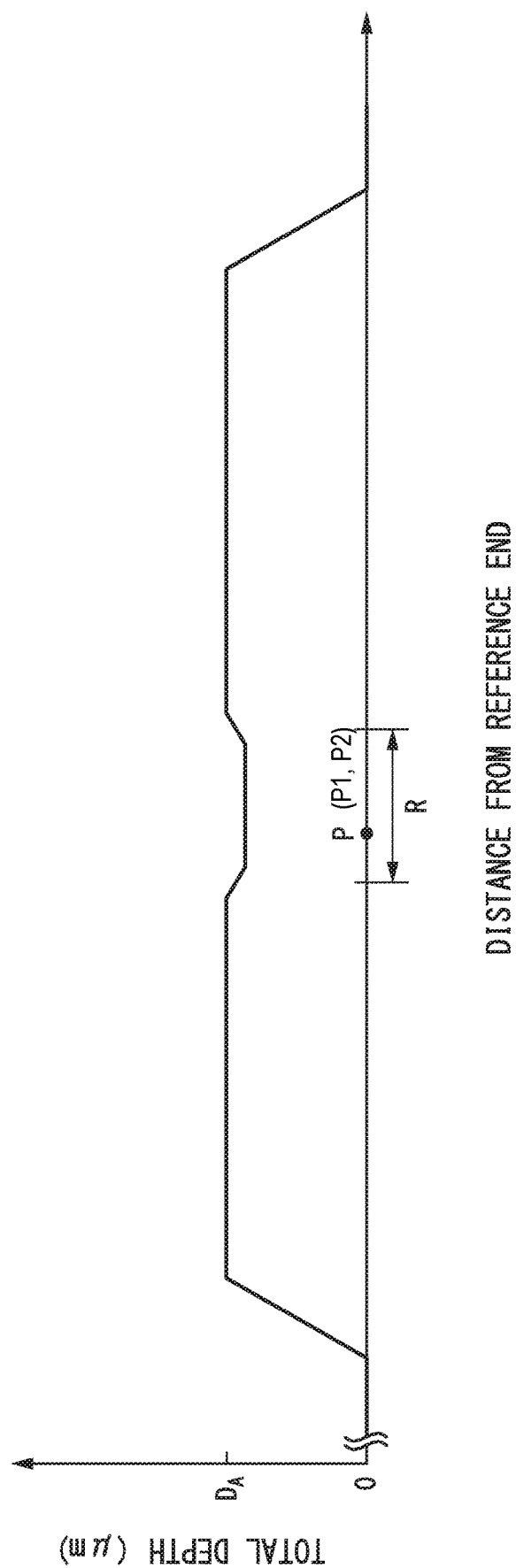
FIG. 11 is a graph illustrating a distribution of a total value of groove depths of adjacent grooves in a case illustrated in FIG. 10.

An example, in which the width of the overlapping region R between the first groove 31 and the second groove 32 which are adjacent to each other is different from the width in the example illustrated in FIG. 8, is illustrated in FIG. 10 and FIG. 11. In a case of the example illustrated in FIG. 10, regions of inclined portions 5 of the first groove 31 and the second groove 32 overlap each other. That is, overlapping is made in such a manner that the first longitudinal groove projection line LWP1 and the second longitudinal groove projection line LWP2 intersect each other at positions of the inclined portions 5 of the first groove 31 and the second groove 32. As illustrated in FIG. 11, in the overlapping region R, the minimum value of the total groove depth of the first groove 31 and the second groove 32 at points P (P1, P2) at which distances from the reference end 21a are the same as each other becomes smaller than the average groove group depth $D_A$ in the sheet width direction Y. The minimum value of the total depth in the overlapping region R and the iron loss in the grain-oriented electrical steel sheet including the groove group 30 have a correlation. Furthermore, when the first groove 31 and the second groove 32 overlap each other to satisfy the above-described condition, an inclination angle (first angle θ) in the groove ends of the grooves 31 and 32 does not have an effect on iron loss characteristics.

That is, in the overlapping region R of the first groove 31 and the second groove 32, when the total value of the depths of the first groove 31 and the second groove 32 is $0.5 \times D_A$ or greater, in the overlapping region R, it is possible to secure a depth comparable to the depth of the bottom 4 that is a region in which overlapping is not made. According to this, in the shed width direction Y, a decrease in the magnetic domain refinement effect doe to a rapid decrease in the depth of the groove portion is suppressed. As a result, it is possible to improve the iron loss.

More preferably, when adjacent grooves are arranged in such a manner that the total depth of the depth of the first groove 31 and the depth of the second groove 32 at points P (P1, P2) in the sheet width direction Y in the overlapping region R of the first groove 31 and the second groove 32 becomes $0.7 \times D_A$ or greater with respect to the average value (average groove group depth) $D_A$ of depths of a plurality of grooves which are formed in the sheet width direction Y, a groove depth (in the overlapping region R, a total groove depth of the two grooves 31 and 32) preferable for an improvement of the iron loss in the sheet width direction Y is sufficiently obtained, and the iron loss can be improved. The upper limit of the total depth of the depth of the first groove 31 and the depth of the second groove 32 at the points P (P1, P2) in the sheet width direction Y is not limited, but the upper limit may be two or less times the average groove group depth $D_A$ when considering a decrease in a magnetic flux density. In addition, when the total depth of the depth of the first groove 31 and the depth of the second groove 32 at the points P (P1, P2) in the sheet width direction Y is set to two or less times the average groove group depth $D_A$, a variation amount of the groove depth in the sheet width direction Y is suppressed to be small. Accordingly, it is possible to stably improve the iron loss in a more effective manner.

In the grain-oriented electrical steel sheet 1 according to this embodiment, when both ends (the first groove ends 31a and 32a, and the second groove ends 31b and 32b) of the groove 3 in the longitudinal groove direction L are perpendicular to the steel sheet surface 2a, theoretically, it is considered that a sufficient iron loss is obtained even when the overlapping region R is not present.

However, it may be difficult to reliably form a groove having a cross-section that is perpendicular to the steel sheet surface 2a. In addition, in a case of forming a groove in which a depth with respect to the steel sheet surface 2a is greater than 10 μm, a variation in a shape of the end of the groove 3 tends to increase. Therefore, when performing coating so as to apply electrical insulation properties to the steel sheet surface 2a after forming the groove 3, it may be difficult to apply a coating agent to every corner of the end of the groove 3. In addition, the variation in the shape of the end of the groove 3 is great. Therefore, adhesiveness of the coating agent may not be sufficient at some sites of the end of the groove 3. As a result, uniform application of the coating agent may be difficult, and a problem related to the rust resistance may occur. In this case, the both ends of the groove 3 may be inclined. In the grain-oriented electrical steel sheet 1 according to this embodiment, an inclined surface is formed at the end of the groove 3 in the longitudinal groove direction L to stabilize the shape of the end of the groove 3. According to this, the rust resistance is improved. In addition, when at least inclined surfaces of ends of a plurality of the grooves 3 are made to overlap each other in the first longitudinal groove projection line LWP1 and the second longitudinal groove projection line LWP2 in the sheet width direction Y, it is possible to maintain the iron loss and the rust resistance in a satisfactory manner. As a result, the above-described configuration is preferable.

In the grain-oriented electrical steel sheet 1 according to this embodiment, when satisfying the following condition, it is possible to realize an improvement of the rust resistance and an improvement of the iron loss.

As illustrated in FIG. 2, an end of the groove 3, which is provided in the grain-oriented electrical steel sheet 1 according to this embodiment, is inclined so that in groove ends 31a and 31b of the groove 3 in the longitudinal groove direction L, a relationship between an angle (first angle θ) made by the groove end straight line 3E and the steel sheet surface 2a, and an aspect ratio A obtained by dividing the average groove depth D by the average groove width W satisfy the following Expression (1).

$$\theta < -21 \times A + 77 \tag{1}$$

The first angle θ, which represents an inclination angle of the inclined portion 5, is defined on the basis of an aspect ratio A (=D/W) that is obtained by dividing the average groove depth D by the average groove width W. Typically, as the average groove depth D is greater, the iron loss affected by the groove depth is improved. In addition, as the average groove width W is smaller, a deterioration amount of a magnetic flux density that deteriorates due to removal of a steel portion is suppressed to be small. Accordingly, the iron loss can be improved. That is, as the aspect ratio A is greater, it is possible to preferably control the magnetic characteristics. On the other hand, as the aspect ratio A is greater, a coating solution is less likely to intrude into the groove. Therefore, the rust resistance deteriorates. Particularly, the rust resistance deteriorates at the groove end of the groove 3. Accordingly, it is necessary to control the aspect ratio A and the first angle θ in combination with each other so as to make the magnetic characteristics and the rust resistance be compatible with each other. Specifically, when the first angle θ of the groove 3 deviates from the range of Expression (1), the inclination angle of the groove end of the groove 3 with respect to the aspect ratio becomes great. Therefore, it is difficult to coat the groove 3 with the glass film or the insulating film al the groove end of the groove 3. As a result, rust is likely to occur at the groove end of the groove 3.

That is, as the average groove depth D is deeper, it is necessary make the inclination angle (first angle θ) at the groove end be smaller so as to suppress occurrence of rust. In addition, as the average groove width W is narrower, it is necessary to make the inclination angle (first angle θ) at the groove end be smaller so as to suppress occurrence of rust. In addition, when a relationship of the average groove depth D, the average groove width W, and the first angle θ satisfies Expression (1), it is possible to attain the effect of making a magnetic characteristic improvement and rust resistance be compatible with each other in the groove 3.

Furthermore, Expression (1) is a range suitable for a case where the average groove depth D of the groove 3 is 5 μm or greater. When the average groove depth D of the groove 3 is less than 5 μm, a difference in a shape of the end of the groove 3 is small, and a problem relating to the rust resistance is less likely to occur. On the other hand, when the average groove depth D of the groove 3 is less than 5 μm, refinement of the magnetic domain due to formation of the groove may not be sufficient. The upper limit of the depth of the groove 3 is not particularly limited. However, when the average groove depth D of the groove 3 becomes 30% or greater with respect to the thickness of the grain-oriented electrical steel sheet in the sheet thickness direction Z, the amount of the grain-oriented electrical steel sheet that is a magnetic material, that is, the amount of the steel sheet decreases. Therefore, there is a concern that the magnetic flux density may decrease. For example, the upper limit of the average depth D of the groove 3 may be 100 μm when considering that a typical thickness of the grain-oriented electrical steel sheet for a wound transformer is 0.35 mm or less. The groove 3 may be formed in one surface of the grain-oriented electrical steel sheet, or may be formed in both surfaces thereof.

From a result of an experiment, it becomes apparent that it is preferable for the following Expression (2) to be satisfied in addition to Expression (1), because occurrence of rust can be suppressed with higher accuracy.

$$\theta < 32 \times A^2 - 55 \times A + 73 \qquad (2)$$

In addition, it becomes apparent that in a case where the average groove depth D is in a range of 15 μm to 30 μm, it is more preferable for the first angle θ of the groove end of the groove 3 to satisfy the following Expression (3) with respect to the average groove depth D and the average groove width W from the viewpoint of improving the rust resistance.

$$\theta \le 0.12 \times W - 0.45 \times D + 57.39 \qquad (3)$$

In addition, in a case where the average groove width W is greater than 30 μm and equal to or less than 100 μm, it becomes apparent that it is more preferable for the first angle θ of the groove end of the groove 3 to satisfy the following Expression (4) with respect to the average groove depth D and the average groove width W from the viewpoint of improving the rust resistance.

$$\theta \le -0.37 \times D + 0.12 \times W + 55.39 \qquad (4)$$

In the grain-oriented electrical steel sheet 1 according to this embodiment, even in a case where the average groove depth D is 15 μm to 30 μm, when the groove 3 is formed in such a manner that the first angle θ satisfies Expression (3), covering with the glass film or the insulating film is possible without a deviation, and it is possible to make the magnetic characteristics and the rust resistance be compatible with each other.

Similarly, even in a case where the average groove width W is greater than 30 μm and equal to or less than 100 μm, when the first angle θ satisfies Expression (4), the magnetic characteristics and the rust resistance can be compatible with each other. In a case where a plurality of grooves are formed in the grain-oriented electrical steel sheet, when the above-described conditions are satisfied with respect to the entirety of the grooves, a grain-oriented electrical steel sheet with high quality is obtained. However, in a case where ends of the groove reach both end surfaces of the grain-oriented electrical steel sheet in the sheet width direction Y, the inclined portion is not formed at the ends of the groove. Accordingly, it is needless to say that the above-described conditions are not applied.

A glass film having an average thickness of 0 to 5 μm and an insulating film having an average thickness of 1 μm to 5 μm may be disposed in the groove 3. In addition, a glass film having an average thickness of 0.5 μm to 5 μm and an insulating film having an average thickness of 1 μm to 5 μm may be disposed on the steel sheet surface 2a. In addition, the average thickness of the glass film in the groove 3 may be smaller than the average thickness of the glass film on the steel sheet surface 2a.

Furthermore, when employing a configuration in which the glass film does not exist in the groove 3 (that is, a configuration in which the average thickness of the glass film in the groove 3 is zero), it is possible to further reduce a distance (groove width) between groove wall surfaces which face each other. Accordingly, it is possible to further improve the magnetic domain refinement effect (that is, the anomalous eddy current loss reducing effect) due to the groove 3.

In addition, in this embodiment, the glass film is not an essential constituent element. Accordingly, when the embodiment is applied to with respect to a grain-oriented electrical steel sheet that is constituted by only the steel sheet 2 and the insulating film, it is also possible to obtain an effect of improving the rust resistance. In the grain-oriented electrical steel sheet that is constituted by only the steel sheet 2 and the insulating film, an insulating film having an average thickness of 1 μm to 5 μm may be formed in the groove 3, and an insulating film having an average thickness of 1 μm to 5 μm may be formed on the steel sheet surface 2a.

In this embodiment, in the steel sheet 2, it is preferable that an average grain size of a crystal grain (secondary recrystallized grain) that is in contact with the groove 3 is 5 μm or greater. In addition, the upper limit of the grain size of the crystal grain that is in contact with the groove 3 is not particularly limited, but the upper limit may be set to $100 \times 10^3$ μm or less. In a case where a melted and resolidified region, which is derived from formation of the groove 3, exists at the periphery of the groove 3, the grain size of the crystal grain that is in contact with the groove 3 becomes fine.

In this case, there is a high possibility that the crystal orientation finally deviates from the {110}<001> orientation. Therefore, there is a high possibility that preferable magnetic characteristics are not obtained. Accordingly, it is preferable that the melted and resolidified region does not exist at the periphery of the groove 3. In a case where the melted and resolidified region does not exist at the periphery of the groove 3, the average grain size of the crystal grain (secondary recrystallized grain) that is in contact with the groove 3 becomes 5 μm or greater. In addition, the upper limit of the grain size of the crystal grain that is in contact with the groove 3 is not particularly limited, but the upper limit may be set to $100 \times 10^3$ μm or less.

Furthermore, the grain size of the crystal grain represents an equivalent circle diameter. For example, the grain size of the crystal grain may be obtained in accordance with a typical crystal grain size measurement method such as ASTM E112, or may be obtained in accordance with an electron back scattering diffraction pattern (EBSD) method. In addition, the crystal grain that is in contact with the groove 3 may be observed on the transverse groove cross-section or a cross-section that is perpendicular to the sheet thickness direction Z. For example, the groove that does not include the melted and resolidified region may be obtained in accordance with a manufacturing method to be described later.

Particularly, in a case where the groove 3 is seen on the transverse groove cross-section, it is preferable that a grain size of a crystal grain (secondary recrystallized grain), which exists on a lower side of the groove 3 in the steel sheet 2, in the sheet thickness direction is equal to or greater than 5 μm and equal to or less than the sheet thickness of the steel sheet 2. This characteristic represents that a fine grain layer (melted and resolidified region), in which a grain size of a crystal grain in a sheet thickness direction is approximately 1 μm, does not exist on a lower side of the groove 3 in the steel sheet 2.

Figure 12:
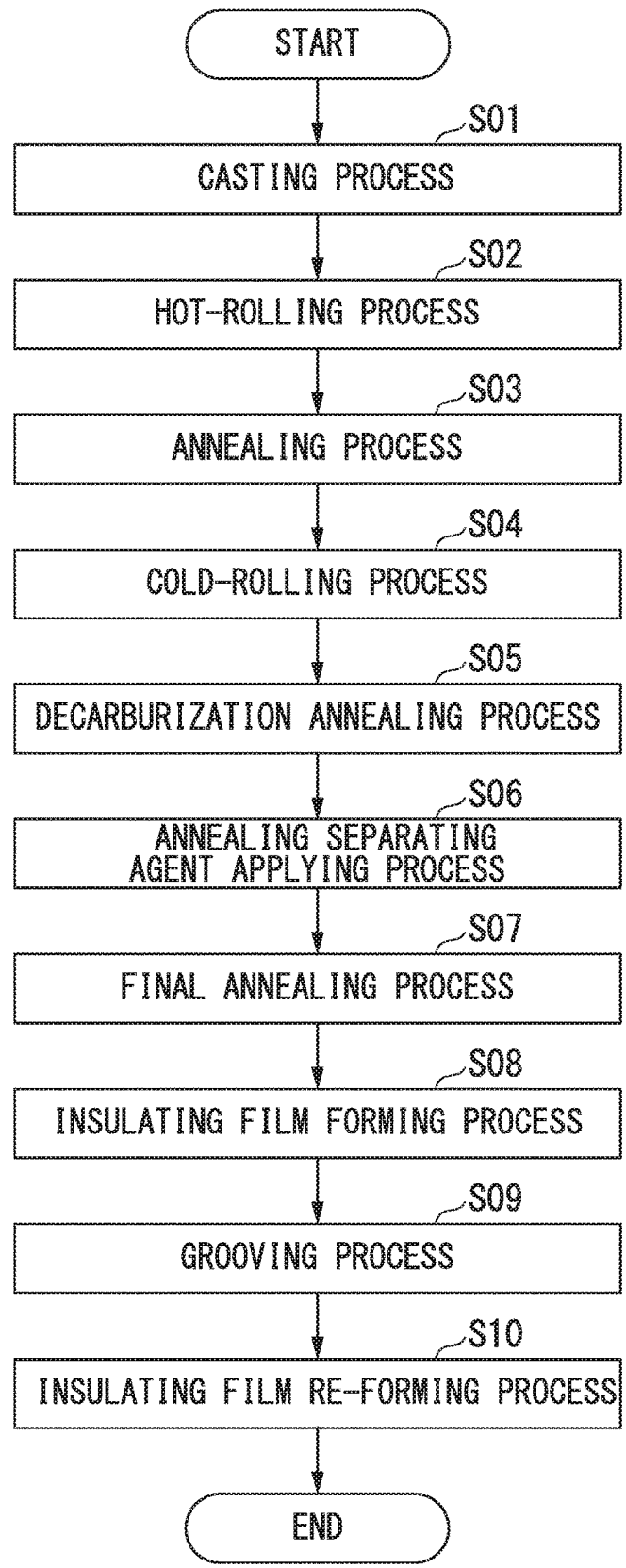
FIG. 12 is a flowchart illustrating manufacturing processes of the grain-oriented electrical steel sheet according to this embodiment.

Next, description will be given of a method of manufacturing the grain-oriented electrical steel sheet 1 according to this embodiment. FIG. 12 is a flowchart illustrating manufacturing processes of the grain-oriented electrical steel sheet 1. As illustrated in FIG. 12, in a first casting process S01, molten steel, which has a chemical composition including, in terms of mass fraction, Si: 0.8% to 7%, C: greater than 0% and equal to or less than 0.085%, acid-soluble Al: 0% to 0.065%, N: 0% to 0.012%, Mn: 0% to 1%, Cr: 0% to 0.3%, Cu: 0% to 0.4%, P: 0% to 0.5%, Sn: 0% to 0.3%, Sb: 0% to 0.3%, Ni: 0% to 1%, S: 0% to 0.015%, Se: 0% to 0.015%, and the remainder including Fe and unavoidable impurities, is supplied to a continuous casting machine, and a slab is continuously produced. Subsequently, in a hot-rolling process S02, the slab obtained in the casting process S01 is heated under a predetermined temperature condition (for example, 1150° C. to 1400° C.), and hot-rolling is performed with respect to the slab. According to this, for example, a hot-rolled steel sheet having the thickness of 1.8 to 3.5 mm is obtained.

Subsequently, in an annealing process S03, an annealing treatment is performed with respect to the hot-rolled steel sheet obtained in the hot-rolling process S02 under a predetermined temperature condition (for example, a condition in which heating is performed at 750° C. to 1200° C. for 30 seconds to 10 minutes).

Subsequently, in a cold-rolling process S04, pickling is performed as necessary with respect to a surface of the hot-rolled steel sheet that is subject to the annealing treatment in the annealing process S03, and then cold-rolling is performed with respect to the hot-rolled steel sheet. According to this, for example, a cold-rolled steel sheet having the thickness of 0.15 to 0.35 mm is obtained.

Subsequently, in a decarburization annealing process S05, a heat treatment (that is, a decarburization annealing treatment) is performed with respect to the cold-rolled steel sheet obtained in the cold-rolling process S04 under a predetermined temperature condition (for example, a condition in which heating is performed at 700° C. to 900° C. for 1 to 3 minutes) in a humid atmosphere. When the decarburization annealing treatment is performed, in the cold-rolled steel sheet, carbon is reduced to a predetermined amount or less, and primary recrystallized structure is formed. In addition, in the decarburization annealing process S05, an oxide layer, which contains silica ($SiO_2$) as a main component, is formed on a surface of the cold-rolled steel sheet.

Subsequently, in an annealing separating agent applying process S06, an annealing separating agent, which contains magnesia (MgO) as a main component, is applied to the surface (the surface of the oxide layer) of the cold-rolled steel sheet. Subsequently, in final annealing process S07, a heat treatment (that is, a final annealing treatment) is performed with respect to the cold-rolled steel sheet onto which the annealing separating agent is applied under a predetermined temperature condition (for example, a condition in which heating is performed at 1100° C. to 1300° C. for 20 to 24 hours). When the final annealing treatment is performed, secondary recrystallization occurs in the cold-rolled steel sheet, and the cold-rolled steel sheet is purified. As a result, it is possible to obtain a cold-rolled steel sheet which has the above-described chemical composition of the steel sheet 2 and in which a crystal orientation is controlled so that a magnetization easy axis of a crystal grain and the rolling direction X match each other (that is, the steel sheet 2 in a state before the groove 3 is formed in the grain-oriented electrical steel sheet 1).

In addition, when the final annealing treatment is performed as described above, an oxide layer containing silica as a main component reacts with the annealing separating agent that contain magnesia as a main component, and the glass film (not illustrated) including a composite oxide such as forsterite ($Mg_2SiO_4$) is formed on a surface of the steel sheet 2. In the final annealing process S07, the final annealing treatment is performed in a state in which the steel sheet 2 is coiled in a coil shape. The glass film is formed on the surface of the steel sheet 2 during the final annealing treatment. Accordingly, it is possible to prevent adhering to the steel sheet 2 that is coiled in a coil shape.

In an insulating film forming process S08, for example, an insulating coating solution containing colloidal silica and a phosphate is applied to the steel sheet surface 2a from an upper side of the glass film. Then, when a heat treatment is performed under a predetermined temperature condition (for example, 840° C. to 920° C.), the insulating film is formed on the surface of the glass film.

Subsequently, in a grooving process S09, the groove 3 is formed in the steel sheet surface 2a on which the glass film and the insulating film are formed. In the grain-oriented electrical steel sheet 1 according to this embodiment, the groove can be formed by a method such as a laser method, a press machine method, and an etching method. Hereinafter, description will be given of a method of forming the groove 3 in a case of using the laser method, the press machine method, the etching method, and the like in the groove forming process S09.

(Groove Forming Method According to Laser Method)

Description will be given of a groove forming method according to the laser method.

In the grooving process S09, the surface (only one surface) of the steel sheet, on which the glass film is formed, is irradiated with laser light to form a plurality of the grooves 3, which extend in a direction intersecting the rolling direction X, in the surface of the steel sheet 2 along the rolling direction X at a predetermined interval.

As illustrated in FIG. 12, in the grooving process S09, a laser light YL emitted from a laser light source (not illustrated) is transmitted to a laser irradiation device 10 through an optical fiber 9. A polygon mirror (not illustrated) and a rotary driving device (not illustrated) of the polygon mirror are embedded in the laser irradiation device 10. The laser irradiation device 10 irradiates the surface of the steel sheet 2 with the laser light YL and scans the steel sheet 2 with the laser light YL in a direction that is approximately parallel to the sheet width direction Y of the steel sheet 2 due to rotation of the polygon mirror.

An assist gas 25 such as air and an inert gas is sprayed to a portion of the steel sheet 2 which is irradiated with the laser light YL in combination with the irradiation with the laser light YL. Examples of the inert gas include nitrogen, argon, and the like. The assist gas 25 plays a role of removing a component that is melted or evaporated from the steel sheet 2 with the laser irradiation. The laser light YL stably reaches the steel sheet 2 due to the spraying of the assist gas 25. Accordingly, the groove 3 is stably formed. In addition, it is possible to suppress the component from being attached to the steel sheet 2 due to the spraying of the assist gas 25. As a result, the groove 3 is formed along a scanning line of the laser light YL.

Figure 13:
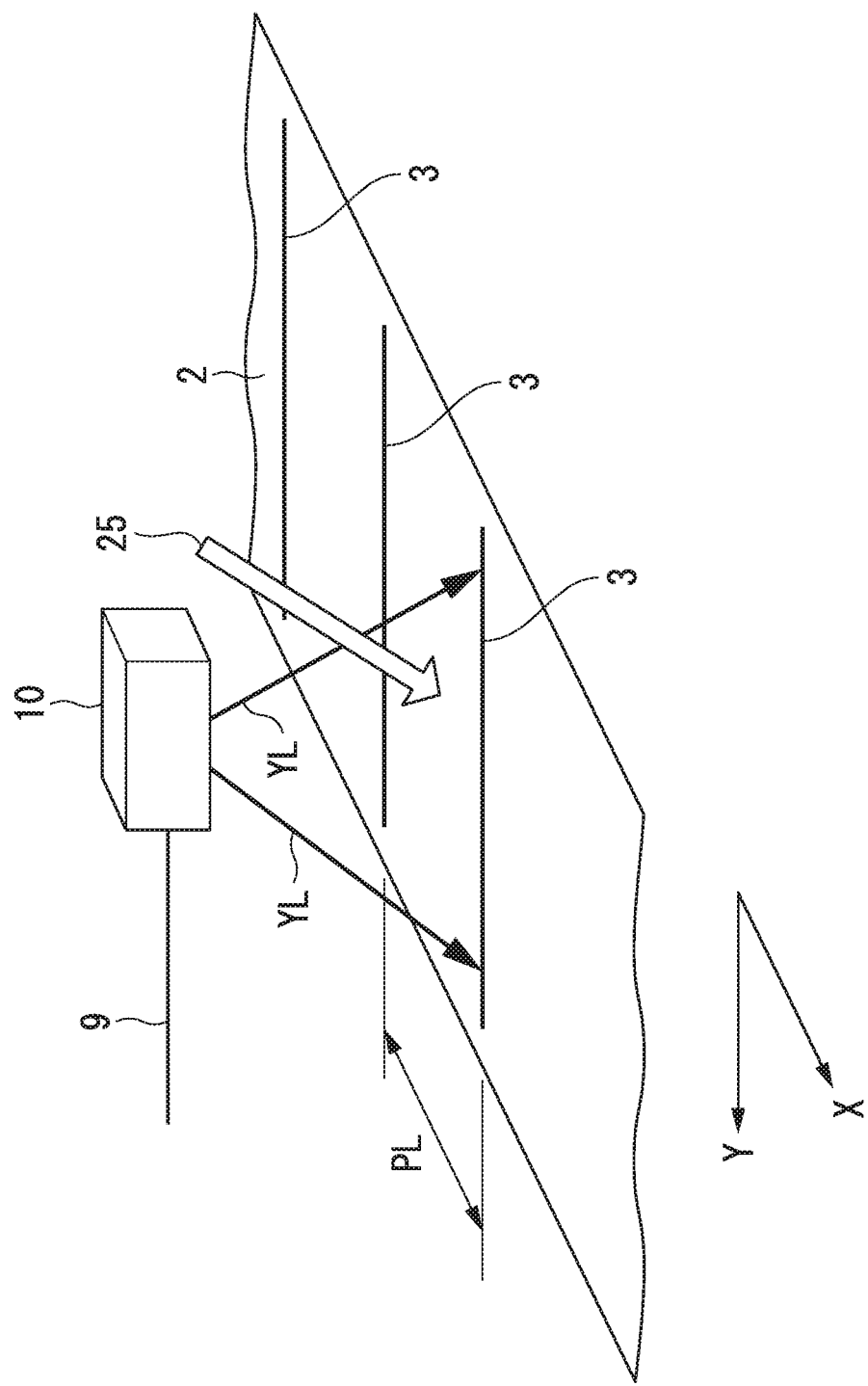
FIG. 13 is a view illustrating laser irradiation in a grooving process of the manufacturing processes of the grain-oriented electrical steel sheet according to this embodiment.

The surface of the steel sheet 2 is irradiated with the laser light YL while the steel sheet 2 is conveyed along a sheet travelling direction that matches the rolling direction X. Here, a rotational speed of the polygon mirror is controlled in synchronization with a conveying speed of the steel sheet 2 so that the groove 3 is formed at a predetermined interval PL along the rolling direction X. As a result, as illustrated in FIG. 13, a plurality of the grooves 3, which intersect the rolling direction X, are formed in the surface of the steel sheet 2 at the predetermined interval PL along the rolling direction X.

As the laser light source, for example, a fiber laser can be used. A high output laser such as a YAG laser, a semiconductor laser, and a $CO_2$ laser, which are typically used for industry, may be used as the laser light source. In addition, a pulse laser or a continuous wave laser may be used as the laser light source as long as the groove 3 can be stably formed. As irradiation conditions with the laser light YL, for example, it is preferable that a laser output is set to 200 W to 2000 W, a light-condensing spot diameter of the laser light YL in the rolling direction X (that is, a diameter including 86% of the laser output, hereinafter, referred to as 86% diameter) is set to 10 μm to 1000 μm, a light-condensing spot diameter (86% diameter) in the sheet width direction Y of the laser light YL is set to 10 μm to 4000 μm, a laser scanning speed is set to 1 m/s to 100 m/s, and a laser scanning pitch (interval PL) is set to 4 mm to 10 mm.

Figure 14:
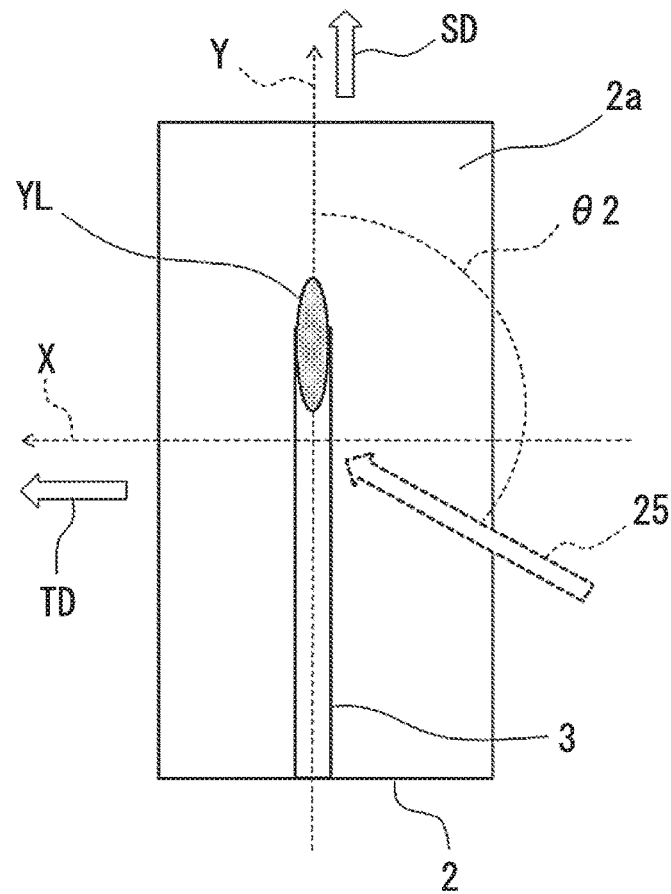
FIG. 14 is a view illustrating laser irradiation in the grooving process of the manufacturing processes of the grain-oriented electrical steel sheet according to this embodiment.
Figure 15:
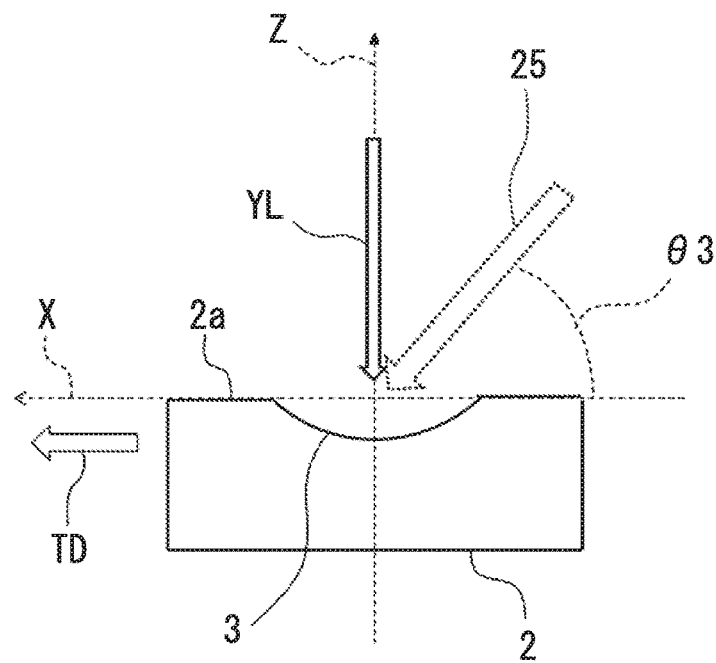
FIG. 15 is a view illustrating laser irradiation in the grooving process of the manufacturing processes of the grain-oriented electrical steel sheet according to this embodiment.

As illustrated in FIG. 14, in the grooving process S09 of this embodiment, in a plan view of the steel sheet 2 that is conveyed along the sheet travelling direction TD parallel to the rolling direction X, the assist gas 25 is sprayed from a direction having an inclination of an angle θ2 with respect to the laser scanning direction SD (direction parallel to the sheet width direction Y) of the laser light YL so as to conform to the laser light YL. In addition, as illustrated in FIG. 15, when the steel sheet 2, which is conveyed along the sheet travelling direction TD, is seen from the sheet width direction Y (laser scanning direction SD), the assist gas 25 is sprayed from a direction having an inclination of an angle θ3 with respect to the steel sheet surface 2a to conform to the laser light YL. It is preferable that the angle θ2 is set in a range of 90° to 180°, and the angle θ3 is set in a range of 1° to 85°. In addition, it is preferable that a flow rate of the assist gas 25 is set in a range of 10 liters/minute to 1000 liters/minute.

In addition, it is preferable to perform an atmosphere control so that the amount of particles, which exist in a sheet travelling atmosphere of the steel sheet 2 and have a diameter of 0.5 μm or greater, becomes equal to or greater than 10 pieces and less than 10000 pieces per 1 CF (cubic feet).

Figure 16:
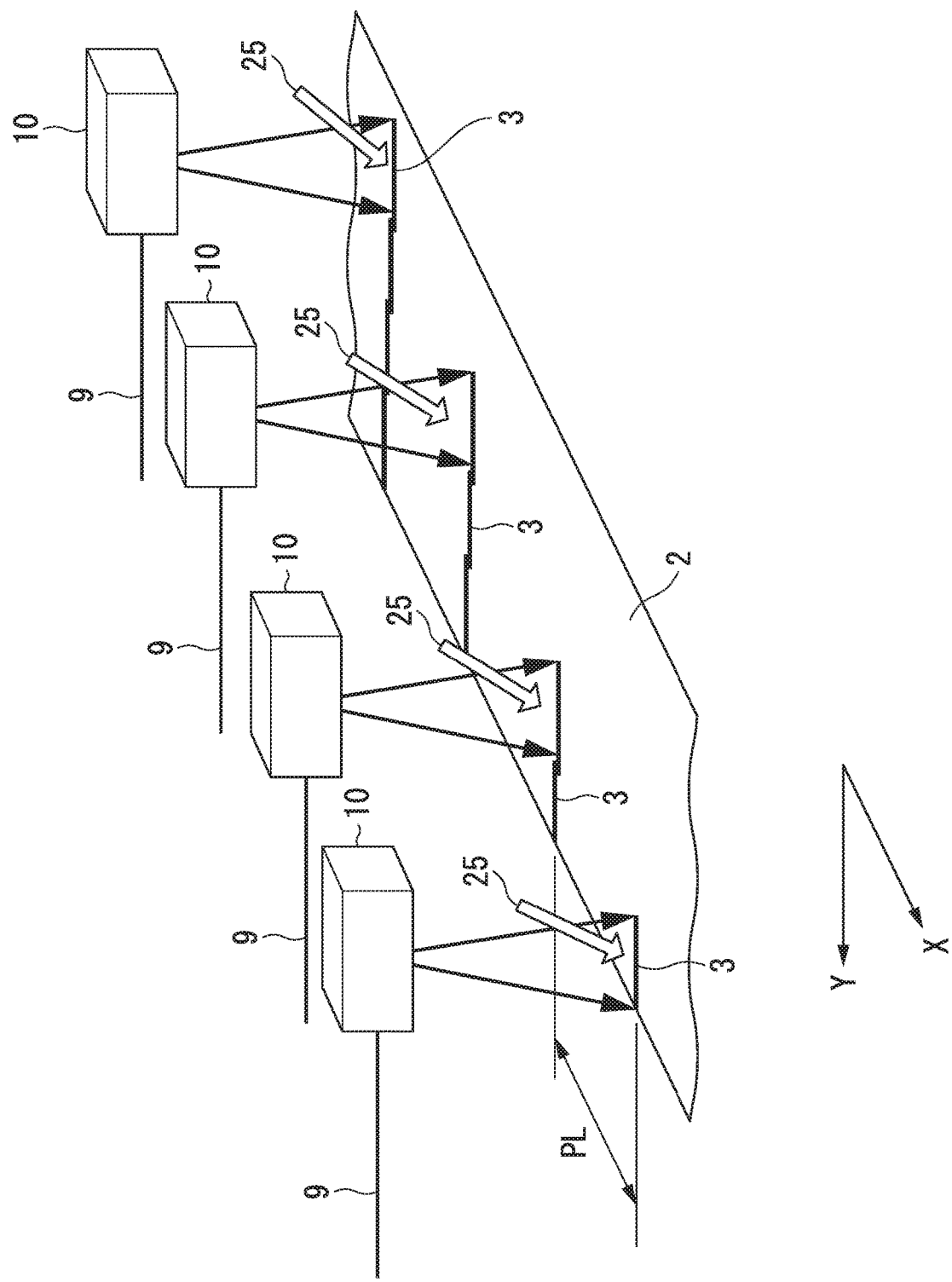
FIG. 16 is a view illustrating laser irradiation in the grooving process of the manufacturing processes of the grain-oriented electrical steel sheet according to this embodiment.

Scanning with a laser beam over the whole width of the grain-oriented electrical steel sheet may be performed by one scanning apparatus as illustrated in FIG. 13, or may be performed by a plurality of the scanning apparatuses as illustrated in FIG. 16. In a case of using one light source, laser beams emitted from the light source and the resultant divided laser beams are used as the laser beam. In a case of using the plurality of laser irradiation devices 10, as illustrated in FIG. 16, the plurality of laser irradiation devices 10 are disposed along the rolling direction X at a predetermined interval. In addition, when seen from the rolling direction X, positions of the respective laser irradiation devices 10 in the sheet width direction Y are set so that laser scanning lines of the respective laser irradiation devices 10 do not overlap each other.

When using the laser irradiation method, a plurality of the grooves 3 can be formed in the steel sheet surface 2a. When using the plurality of scanning apparatuses, an irradiation region can be divided into a plurality of regions in the sheet width direction Y. Accordingly, scanning and irradiation time necessary for one laser beam, are shortened. Accordingly, the method of using the plurality of scanning apparatuses is suitable for high-speed sheet conveying facility. In a case where the plurality of scanning apparatuses are used, only one laser apparatus may be provided as a light source of the laser beam incident to the respective scanning apparatuses, or the laser apparatus may be provided to each of the scanning apparatuses.

A surface of the grain-oriented electrical steel sheet is scanned with the laser beam by one surface of the mirror, and the groove having a predetermined length (for example, 300 mm) is formed in the grain-oriented electrical steel sheet in an approximately width direction. An interval of grooves adjacent to each other in the rolling direction X, that is, an irradiation pitch PL in the rolling direction X (conveying direction) may be changed through adjustment of a velocity of a line VL and an irradiation speed. As described above, the grain-oriented electrical steel sheet is irradiated with the laser beam by using the laser irradiation device to form grooves in the rolling direction X at a constant scanning interval PL (an irradiation pitch, a groove interval). That is, the surface of the grain-oriented electrical steel sheet is irradiated with the laser beam, which is condensed thereto, while being scanned with the laser beam, thereby forming a groove that has a predetermined length and extends in a direction that is approximately perpendicular to the conveying direction of the grain-oriented electrical steel sheet (a direction that intersects the conveying direction, a direction including a vector perpendicular to the conveying direction) at a predetermined interval in the conveying direction. For example, the groove 3 is formed in a range of positive 45° to negative 45+ with respect to a direction that is approximately perpendicular to the conveying direction of the grain-oriented electrical steel sheet.

Figure 17:
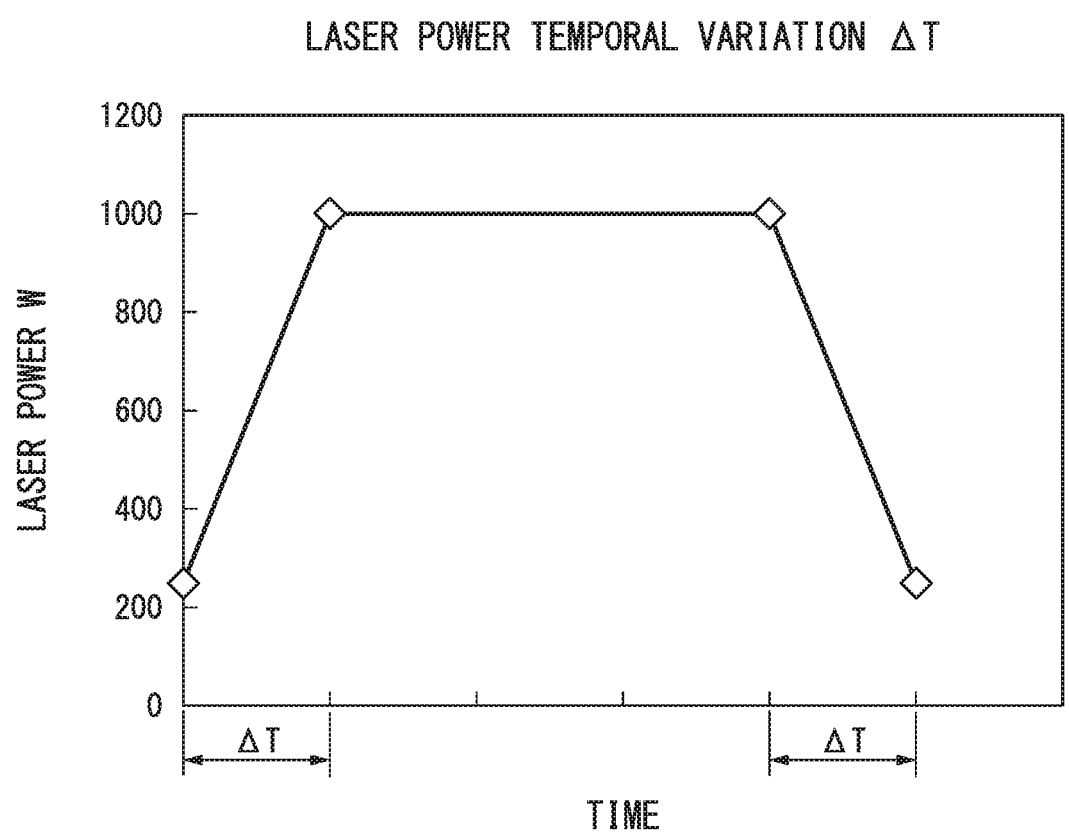
FIG. 17 is a graph illustrating a relationship between laser beam irradiation output and time in the grooving process by a laser method according to this embodiment.

At both scanning ends, an output of the laser is subjected to a temporal variation in synchronization with an operation of the mirror. According to this, the depth of the groove 3 is allowed to vary, and the ends 31a and 31b of the groove 3 are inclined. That is, as illustrated in FIG. 17, in the scanning direction, the output of the laser is set to vary at positions which become ends of the groove 3. For example, a groove width of the groove 3 is 100 μm, a groove depth is 20 μm, an irradiation pitch is 3 mm, and a scanning speed on the steel sheet is 30 m/s, time ΔT, at which the output of the laser is allowed to vary at formation initiation and formation termination of one groove, is set to 0.004 ms or longer so as to set the first angle θ at a groove end to 60° or less. According to this, the groove 3, which is inclined at the first angle θ at ends of the groove 3 in the longitudinal groove direction L, is formed.

For example, as illustrated in FIG. 13, in the irradiation with the laser beam, scanning with the laser beam, which is emitted from the laser apparatus that is a light source, is performed by the scanning apparatus in the sheet width direction Y that is approximately perpendicular to the rolling direction X of the grain-oriented electrical steel sheet at the predetermined interval PL. At this time, the assist gas such as air and an inert gas is sprayed to a portion of the grain-oriented electrical steel sheet which is irradiated with the laser beam. As a result, the groove is formed at a portion on a surface of the grain-oriented electrical steel sheet which is irradiated with the laser beam. The rolling direction X matches the sheet travelling direction.

A temperature of the grain-oriented electrical steel sheet when performing the irradiation with the laser beam is not particularly limited. For example, the irradiation with the laser beam can be performed with respect to the grain-oriented electrical steel sheet that is set to approximately room temperature. It is not necessary for a laser beam scanning direction to match the sheet width direction Y. However, it is preferable that an angle made by the scanning direction and the sheet width direction Y is in a range of 0° to 90° and is 45° or less from the viewpoint of working efficiency and the like, and when considering that a magnetic domain is subdivided into a longitudinal strip shape in the rolling direction X. It is more preferable that the angle made by the scanning direction and the sheet width direction Y is 20° or less, and still more preferably 10° or less.

(Groove Forming Method According to Press Machine Method)

Description will be given of a method of forming the groove 3 of the grain-oriented electrical steel sheet 1 according to this embodiment according to a press machine method. In a case of forming the groove 3 in the grain-oriented electrical steel sheet by the press machine method, the groove is formed by using a tooth press tool corresponding to the shape of the groove 3 according to a known press machine method. That is, the groove 3 is formed by using a tooth press tool in which an inclined portion having the same angle as the first angle θ is formed at ends of the tooth press tool in a length direction.

(Groove Forming Method According to Electrolytic Etching Method)

Description will be given of a method of forming the groove in the grain-oriented electrical steel sheet 1 according to this embodiment according to an electrolytic etching method.

An etching resist layer, of which a portion corresponding to the shape of the groove is opened, is formed on the surface of the grain-oriented electrical steel sheet 1 after the insulating film forming process S08 through printing and the like. With regard to the opening of the etching resist layer, an etching resist is formed to be inclined in such a manner that an opening width in a transverse direction gradually decreases at sites corresponding to groove ends in order for the opening width at both ends to be narrower in comparison to the central portion in the longitudinal groove direction 1. For example, the opening of the etching resist is formed in such a manner that the opening width in the transverse groove direction Q is set to 100 μm or greater, and a length of the sites inclined in correspondence with the groove ends in the longitudinal groove direction L becomes 14 μm to obtain a shape in which the average groove depth D is 20 μm, the groove width in the transverse groove direction Q is 50 μm, and the first angle θ is 55° or less. As a result, an inclined portion 5 is formed at the groove ends in which the opening width of the etching resist is set to be narrow. Then, an etching treatment is performed by using an etchant (NaCl and the like) at a liquid temperature of 30° C. for 20 seconds. Subsequently, the etching resist is peeled off from the grain-oriented electrical steel sheet to form the groove 3 in the steel sheet surface 2a.

After forming the groove 3 in the grooving process S09, the same treatment as in the insulating film forming process is performed again (insulating film re-forming process S10). The thickness of the insulating film that is obtained is 2 to 3 μm. According to the above-described processes, the grain-oriented electrical steel sheet according to this embodiment is obtained.

The steel sheet 2 of the grain-oriented electrical steel sheet 1 manufactured as described above contains, as chemical components in terms of mass fraction. Si: 0.8% to 7%, C: greater than 0% and equal to or less than 0.085%, acid-soluble Al: 0% to 0.065%, N: 0% to 0.012%, Mn: 0% to 1%, Cr: 0% to 0.3%, Cu: 0% to 0.4%, P: 0% to 0.5%, Sn: 0% to 0.3%, Sb: 0% to 0.3%, Ni: 0% to 1%, S: 0% to 0.015% Se: 0% to 0.015%, and the remainder including Fe and unavoidable impurities.

Furthermore, the embodiment exemplifies a case of employing a manufacturing process in which the groove 3 is formed in the steel sheet surface 2a after the insulating film is formed on the steel sheet surface 2a with laser irradiation. In this case, the groove 3 immediately after laser irradiation is exposed to the outside. Accordingly, it is necessary to form an insulating film again on the steel sheet 2 after forming the groove 3. However, in this embodiment, it is possible to employ a manufacturing process in which the groove 3 is formed in the steel sheet surface 2a by irradiating the steel sheet surface 2a with the laser light YL before formation of the insulating film on the steel sheet surface 2a, and then the insulating film is formed on the steel sheet 2. Alternatively, in this embodiment, the glass film or the insulating film may be formed after the groove 3 is formed in the steel sheet 2.

Accordingly, the grain-oriented electrical steel sheet according to this embodiment includes the grain-oriented electrical steel sheet 1 for which high-temperature annealing for secondary recrystallization is completed and coating with the glass film and the insulating film is completed. However, the grain-oriented electrical steel sheet also includes a grain-oriented electrical steel sheet for which coating with the glass film and the insulating film is not completed. That is, a final product may be obtained by performing formation of the glass film and the insulating film as a post process by using the grain-oriented electrical steel sheet according to this embodiment. Furthermore, as described above, in a case of executing the film removing method, it is confirmed that the shape or the roughness of the groove 3 after removing the glass film or the insulating film is approximately the same as those before forming the glass film or the insulating film.

Furthermore, the embodiment exemplifies a case where the grooving process (laser irradiation process) S09 is executed after the final annealing process S07, but the grooving process may be executed between the cold-rolling process S04 and the decarburization annealing process S05. That is, after forming the groove 3 in the steel sheet surface 2a of the cold-rolled steel sheet by performing laser irradiation and spraying of the assist gas with respect to the cold-rolled steel sheet obtained in the cold-rolling process S04, the decarburization annealing may be performed with respect to the cold-rolled steel sheet.

This embodiment exemplifies a configuration in which the longitudinal groove direction L that is the extension direction of the groove 3 is a direction that intersects the rolling direction X and the sheet width direction Y. However, the extension direction of the groove 3 of the grain-oriented electrical steel sheet 1 according to this embodiment is not limited thereto. For example, even when the longitudinal groove direction 1, of the groove 3 is approximately perpendicular to the rolling direction X, the improvement of the magnetic characteristic and the rust resistance are compatible with each other.

In this embodiment, it is possible to improve the rust resistance in the groove 3 that is formed in the steel sheet surface 2a in a depth of 15 µm or greater due to the groove shape having the above-described characteristics. Accordingly, the number of groove 3 that is formed in the grain-oriented electrical steel sheet 1 is not particularly limited. For example, a plurality of the grooves 3 may be formed in the sheet width direction Y and the rolling direction X.

This embodiment exemplifies an example in which the shape of the groove 3 (shape of a boundary portion between the groove 3 and the steel sheet surface 2a) in a plan view is an elongated ellipse. However, the shape of the groove 3 in the grain-oriented electrical steel sheet 1 is not limited thereto. For example, the groove 3 may have an arbitrary shape as long as the inclined portion is provided to the ends in the longitudinal groove direction L and the relationship of Expression (1) is satisfied.

FIG. 3 illustrates an example in which the shape of the groove 3 when seen from the transverse groove direction Q is asymmetrical to the groove width center in the transverse groove direction Q. However, the shape of the groove 3 is not limited thereto.

The grain-oriented electrical steel sheet 1 according to this embodiment exhibits the effect in a case where the average groove depth D is 10 µm to 50 µm.

This embodiment exemplifies an example in which the longitudinal groove direction L that is the extension direction of the groove 3 is a direction that intersects the rolling direction X and the sheet width direction Y. However, there is no limitation thereto, and the groove 3 may be extended in a direction that intersects the rolling direction X. For example, even in a case where the extension direction of the groove 3 is a direction that is approximately perpendicular to the rolling direction X, it is possible to suppress the rust resistance of the groove 3.

In addition, in the grain-oriented electrical steel sheet 1 according to this embodiment, as described above, the overlapping region is provided between a plurality of grooves in the sheet width direction Y. Accordingly, even when using the grooves 31, 32 . . . , 3n having an inclined surface, it is possible to suppress the iron loss to a low value. That is, similar to the grain-oriented electrical steel sheet 1 of this embodiment, even in the groove 3 in which an inclined surface is formed on both ends in the longitudinal groove direction L to improve the rust resistance, if a plurality of the grooves 3 are arranged in the sheet width direction Y, and both ends of the grooves 3 adjacent to each other are arranged to overlap each other in the sheet width direction Y, even when the ends of the respective grooves 31, 32, . . . , 3n are shallow, it is possible to improve the iron loss similar to a case where one groove 3 having a uniform depth is formed in the sheet width direction Y.

(Modification Example)

A modification example of the grain-oriented electrical steel sheet 1 according to this embodiment will be described. The grain-oriented electrical steel sheet 1 according to this embodiment may be defined as follows from another viewpoint.

Figure 19:
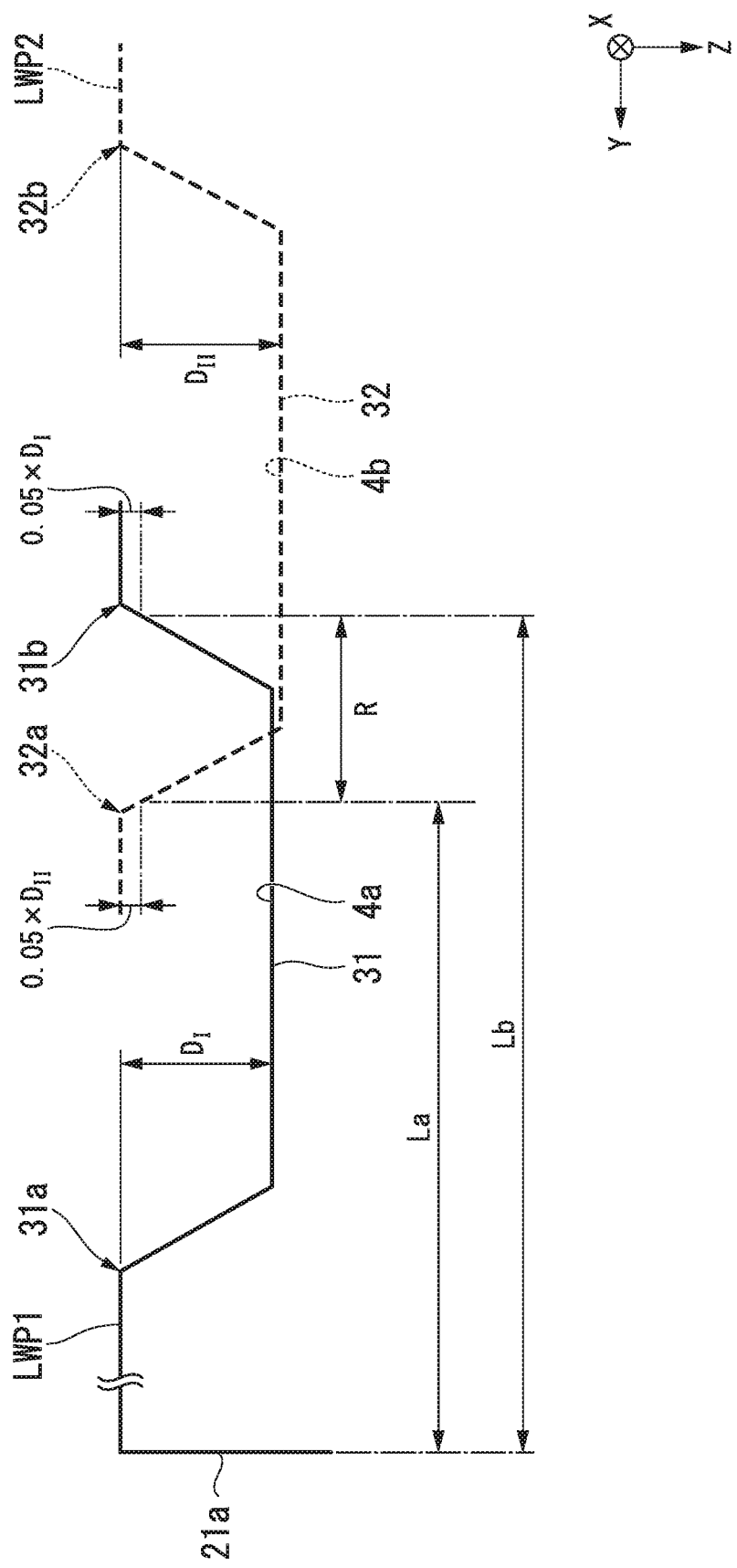
FIG. 19 is a view illustrating a longitudinal groove projection line of adjacent grooves of a groove group of a grain-oriented electrical steel sheet in a modification example of this embodiment.

As illustrated in FIG. 19, an average value of depths of the first longitudinal groove projection line LWP 1, which is a contour of the first groove 31 that is projected onto the projection plane, from the steel sheet surface 2a in the sheet thickness direction Z is set as a first average groove depth $D_I$ in a unit of µm. An average value of depths of the second longitudinal groove projection line LWP2, which is a contour of the second groove 32 that is projected onto the projection plane, from the steel sheet surface 2a in the sheet thickness direction Z is set as a second average groove depth $D_{II}$ in a unit of µm. The overlapping region R of the grain-oriented electrical steel sheet 1 according to this modification example may be defined as a distance between a point (third point), at which a depth from the steel sheet surface 2a in the sheet thickness direction Z becomes $0.05 \times D_{II}$, at the first groove end 32a of the second longitudinal groove projection line LWP2, and a point (fourth point), at which a depth from the steel sheet surface 2a in the sheet thickness direction Z becomes $0.05 \times D_I$, at the second groove end 31b of the first longitudinal groove projection line LWP 1 on the projection plane.

In the grain-oriented electrical steel sheet 1, when a plurality of the grooves 3 are formed in such a manner that the plurality of grooves 3 overlap each other in the sheet width direction Y, even when the grooves 3 include the inclined portion 5, it is possible to suppress the iron loss to a low value. That is, even in the groove 3 in which an inclined portion 5 is formed on both ends in the longitudinal groove direction L to improve the rust resistance, if a plurality of the grooves 3 are arranged in the sheet width direction Y, and both ends of adjacent grooves 3 are arranged to overlap each other in the sheet width direction Y, it is possible to improve the iron loss similar to a case where one groove 3 having a uniform depth is formed in the sheet width direction Y.

In the grain-oriented electrical steel sheet 1 according to this modification example, when satisfying the following condition, it is possible to more preferably improve the iron loss. Specifically, on the projection plane, a distance La between the third point on the second longitudinal groove projection line LWP2 and the reference end 21a is shorter than a distance Lb between the fourth point on the first longitudinal groove projection line LWP1 and the reference end 21a. As a result, it is possible to reliably allow both ends of the grooves 3 adjacent to each other to overlap each other in the sheet width direction Y. Accordingly, it is possible to preferably improve the iron loss.

In the grain-oriented electrical steel sheet 1 according to this modification example, when satisfying the following condition, it is possible to more preferably improve the iron loss. Specifically, on the projection plane, a reference line that is parallel to the sheet thickness direction Z in the overlapping region R is set, with regard to a shape of any reference line in the overlapping region R, a total depth of a depth of the first longitudinal groove projection line LWP 1 from the steel sheet surface 2a in the sheet thickness direction Z and a depth of the second longitudinal groove projection line LWP2 from the steel sheet surface 2a in the sheet thickness direction Z is $0.25 \times (D_I + D_{II})$ or greater in a unit of µm. At this time (when $0.5 \times D_A$ or greater in a case where $D_I = D_{II} = D_A$), it is possible to allow both ends of the grooves 3 adjacent to each other to reliably overlap each other in the sheet width direction Y. Accordingly, it is possible to preferably improve the iron loss. In other words, in the overlapping region R, when the total depth of the first longitudinal groove projection line LWP 1 and the second longitudinal groove projection line LWP2 is $0.25 \times (D_I + D_{II})$ or greater (when the total depth is $0.5 \times D_A$ or greater in a case where $D_I = D_{II} = D_A$), it is possible to preferably improve the iron loss as described above. It is preferable that the total depth is set to $0.35 \times (D_I + D_{II})$ or greater, and more preferably $0.45 \times (D_I + D_{II})$ or greater.

At the second groove end 31b of the first longitudinal groove projection line LWP1, a point, at which a depth from the steel sheet surface 2a in the sheet thickness direction Z becomes $0.95 \times D_I$, is set as a fifth point, and at the first groove end 32a of the second longitudinal groove projection line LWP2, a point, at which a depth from the steel sheet surface 2a in the sheet thickness direction Z becomes $0.95 \times D_{II}$, is set as a sixth point. A distance Lc between the fifth point on the first longitudinal groove projection line LWP 1 and the reference end may be shorter than a distance Ld between the sixth point on the second longitudinal groove projection line LWP2 and the reference end 21a. As a result, it is possible to reduce a steel portion that is removed due to formation of the groove 3. As a result, it is possible to suppress a deterioration amount of a magnetic flux density to a small value, and it is possible to improve the iron loss. In addition, even in a case where grooves overlap each other in such a manner that the distance Lc of the first longitudinal groove projection line LWP 1 becomes shorter than the distance La of the second longitudinal groove projection line LWP2, the same effect is exhibited.

Figure 20:
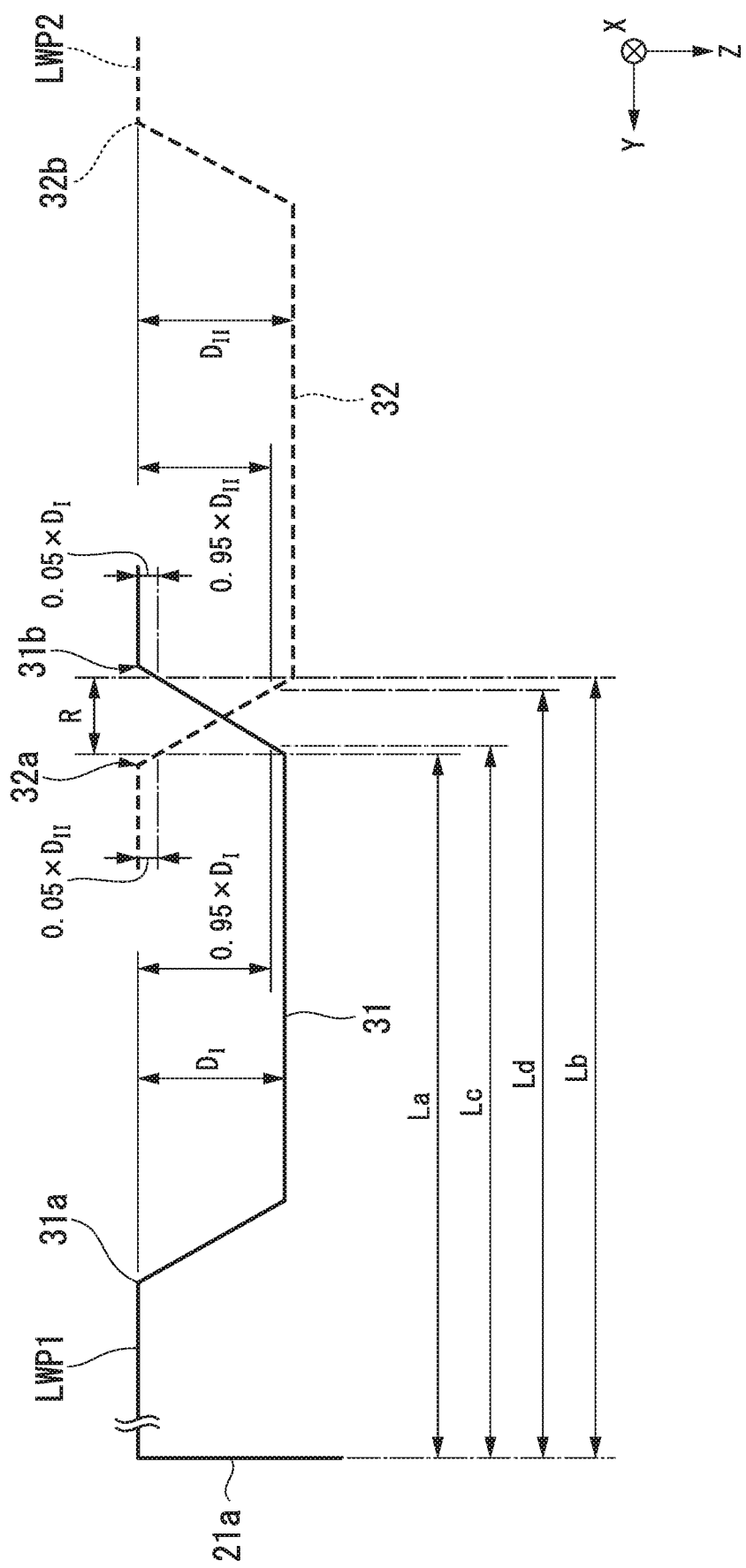
FIG. 20 is a view illustrating a longitudinal groove projection line of adjacent grooves of a groove group of a grain-oriented electrical steel sheer in a modification example of this embodiment.
Figure 21:
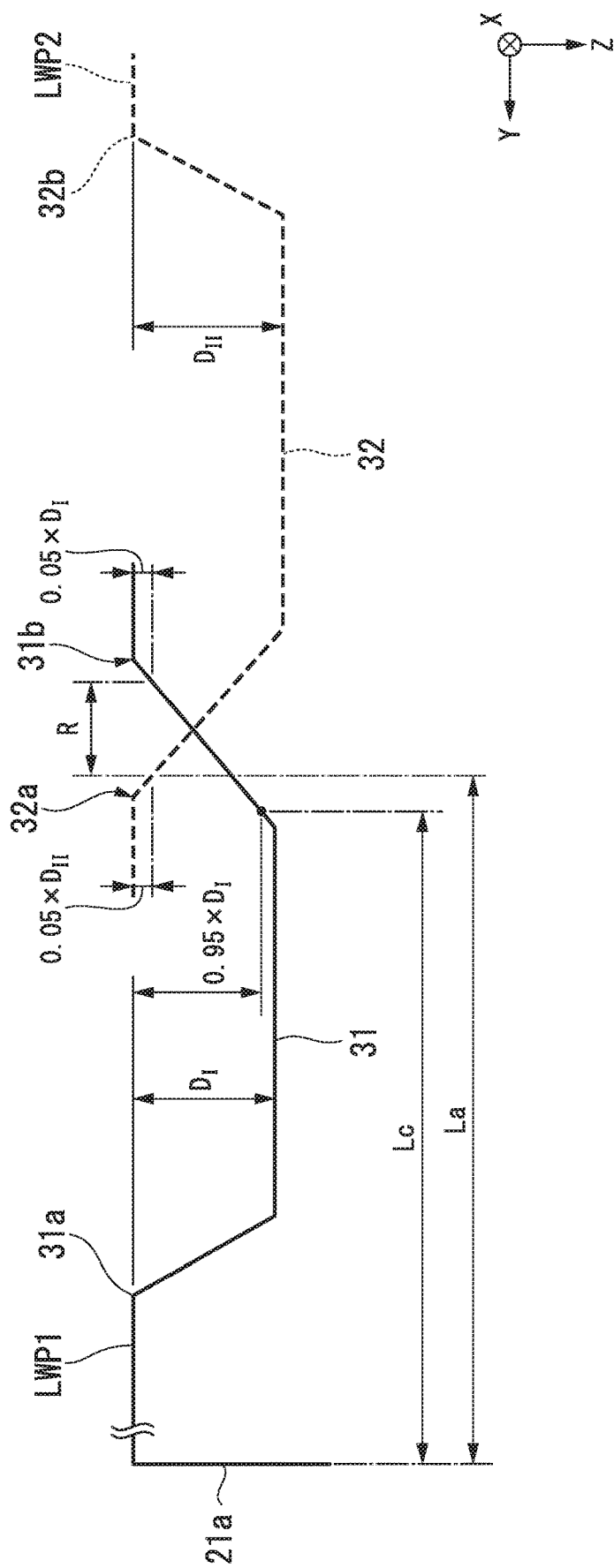
FIG. 21 is a view illustrating a longitudinal groove projection line of adjacent grooves of a groove group of a grain-oriented electrical steel sheet in a modification example of this embodiment.
Figure 22:
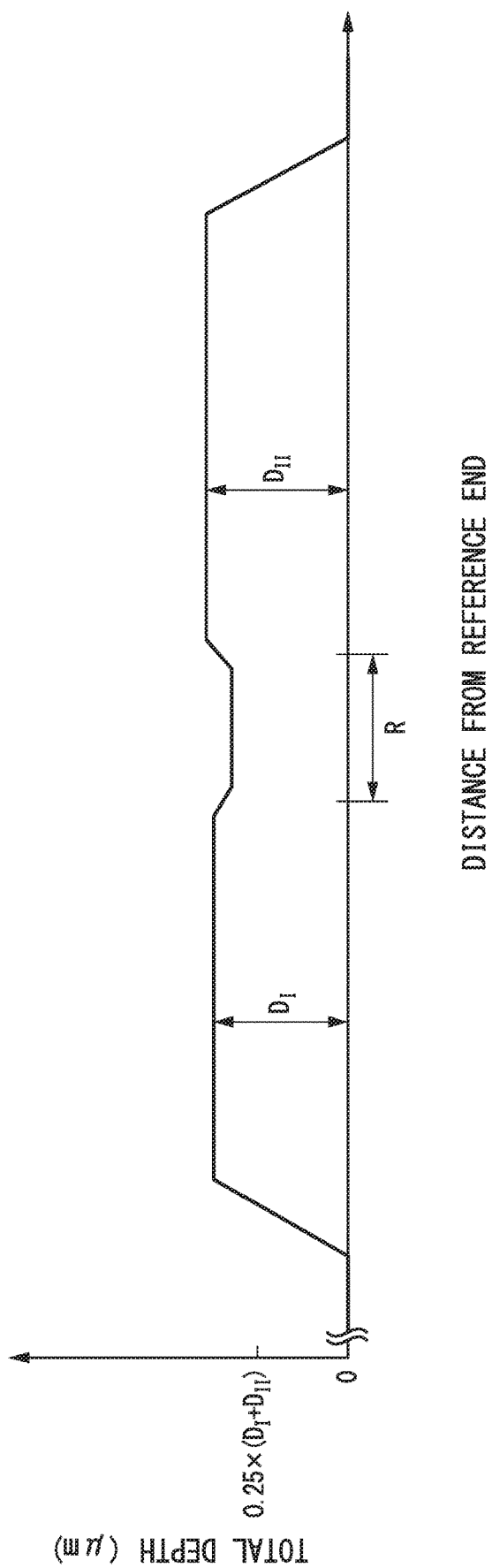
FIG. 22 is a graph illustrating a distribution of a total value of groove depths of adjacent grooves of a grain-oriented electrical steel sheet in a modification example of this embodiment.

FIG. 19 to FIG. 21 illustrate examples which are different in the width of the overlapping region R between the first groove 31 and the second groove 32. Specifically, FIG. 19 illustrates an example in which respective inclined portions 5 of the first groove 31 and the second groove 32 overlap each other, and a part of the bottom 4a of the first groove 31 and a part of the bottom 4b of the second groove 32 overlap each other. FIG. 20 illustrates an example in which the majorities of the inclined portions 5 of the first groove 31 and the second groove 32 overlap each other. That is, in the example illustrated in FIG. 20, the first longitudinal groove projection line LWP 1 and the second longitudinal groove projection line LWP2 overlap each other to intersect at the inclined portions 5. Similar to FIG. 20, FIG. 21 illustrates an example in which grooves overlap each other in such a manner that the first longitudinal groove projection line LWP 1 and the second longitudinal groove projection line LWP2 intersect each other at the inclined portions 5, and the distance Lc of the first longitudinal groove projection line LWP 1 becomes shorter than the distance La of the second longitudinal groove projection line LWP2. In addition, FIG. 22 illustrates a profile of a total depth of the first longitudinal groove projection line LWP 1 and the second longitudinal groove projection line LWP2 which are illustrated in FIG. 21. As illustrated in FIG. 22, in the overlapping region R of the example illustrated in FIG. 21, the minimum value of the total groove depth of the first groove 31 and the second groove 32 at points P at which distances from the reference end 21a are the same as each other becomes smaller than becomes smaller than $0.5 \times (D_I + D_{II})$ (the average groove group depth $D_A$ in a case where $D_I = D_{II} = D_A$). The minimum value of the total depth in the overlapping region R and iron loss characteristics of the grain-oriented electrical steel sheet 1 including the groove group 30 have a correlation. Furthermore, when the first groove 31 and the second groove 32 overlap each other to satisfy the above-described condition, the inclination angle (first angle θ) at the groove end does not have an effect on the iron loss characteristics.

That is, in the overlapping region R, the total groove depth of the first groove 31 and the second groove 32 is set to a depth that is comparable to a depth of a region in which overlapping is not made (when the total groove depth is $0.25 \times (D_I + D_{II})$ or greater), a decrease in the magnetic domain refinement effect due to a rapid decrease in the groove depth is suppressed. As a result, it is possible to improve the iron loss.

In the overlapping region R, the total groove depth of the first groove 31 and the second groove 32 becomes $D_I + D_{II}$ (two times the average groove group depth $D_A$ in a case where $D_I = D_{II} = D_A$) to the maximum. In addition, as described above, it is preferable that the total groove depth becomes $0.25 \times (D_I + D_{II})$ ($0.5 \times D_A$ in a case where $D_I = D_{II} = D_A$) to the minimum. The upper limit of the total groove depth of the first groove 31 and the second groove 32 is not particularly limited. However, as described above, the upper limit becomes $D_I + D_{II}$ to the maximum. Furthermore, when the total groove depth of the first groove 31 and the second groove 32 is set to becomes $0.75 \times (D_I + D_{II})$ or less, and $0.65 \times (D_I + D_{II})$ or less, a variation amount of the total groove depth is suppressed to a small value. Accordingly, it is possible to stably improve the iron loss in a more effective manner. This viewpoint is also true of the example of the grain-oriented electrical steel sheet illustrated in FIG. 21.

EXAMPLES

Hereinafter, an effect of an aspect of the invention will be described more specifically with reference to examples, but a condition in Examples is one conditional example that is employed to confirm operability and an effect of the invention, and the invention is not limited to the one conditional example. The invention may employ various conditions as long as the object of the invention is accomplished without departing from the gist of the invention.

A slab, which has a chemical composition containing, in terms of mass fraction, Si: 3.0%, acid-soluble Al: 0.05%, C: 0.08%, N: 0.01%, Mn: 0.12%, Cr: 0.05%, Cu: 0.04%, P: 0.01%, Sn: 0.02%, Sb: 0.01%, Ni: 0.005%, S: 0.007% Se: 0.001%, and the remainder including Fe and unavoidable impurities, was prepared. The hot-rolling process S02 was executed with respect to the slab to prepare a hot-rolled material having a thickness of 2.3 mm.

Subsequently, a heating treatment was performed with respect to the hot-rolled material under conditions of a temperature of 1000° C. for one minute (annealing process S03). Pickling was performed after the heat treatment, and then cold-rolling was performed (cold-rolling process S04) to prepare a cold-rolled material having the thickness of 0.23 mm.

Decarburization annealing was performed with respect to the cold-rolled material under a condition of a temperature of 800° C. for two minutes (decarburization annealing process S05).

An annealing separating agent containing magnesia as a main component was applied to both surfaces of the cold-rolled material after the decarburization annealing (annealing separating agent applying process S06). The cold-rolled material to which the annealing separating agent was applied was put in a furnace in a state of being coiled in a coil shape, and the final annealing process S07 was performed at a temperature of 1200° C. for 20 hours to prepare steel sheet base metal on which the glass film was formed on a surface thereof.

Next, an insulating material containing aluminum phosphate as a main component was applied onto the glass film, and baking was performed at a temperature of 850° C. for one minute to form the insulating film (insulating film forming process S08).

Subsequently, a plurality of grooves 31, 32, . . . , 3n, in which the average groove depth D was set to 20 μm, the average groove width W was set to 100 μm, the aspect ratio was set to 0.2, and the first angle θ was set to 60°, were formed in the steel sheet surface 2a in the sheet width direction Y by using the laser method under conditions in which the laser scanning pitch (interval PL) was set to 3 mm, the beam diameter was set to 0.1 mm in the rolling direction X and 0.3 mm in the scanning direction, and the scanning speed was set to 30 mm/s (grooving process S09). After the grooving process S09, application of the insulating material including aluminum phosphate as a main component was performed again, and baking was performed at a temperature of 850° C. for one minute to form the insulating film (insulating film re-forming process S10), thereby obtaining the grain-oriented electrical steel sheet.

The steel sheet (steel sheet in which a groove was formed) in the grain-oriented electrical steel sheet, which was finally obtained, mainly contained 3.0% of Si.

Figure 18:
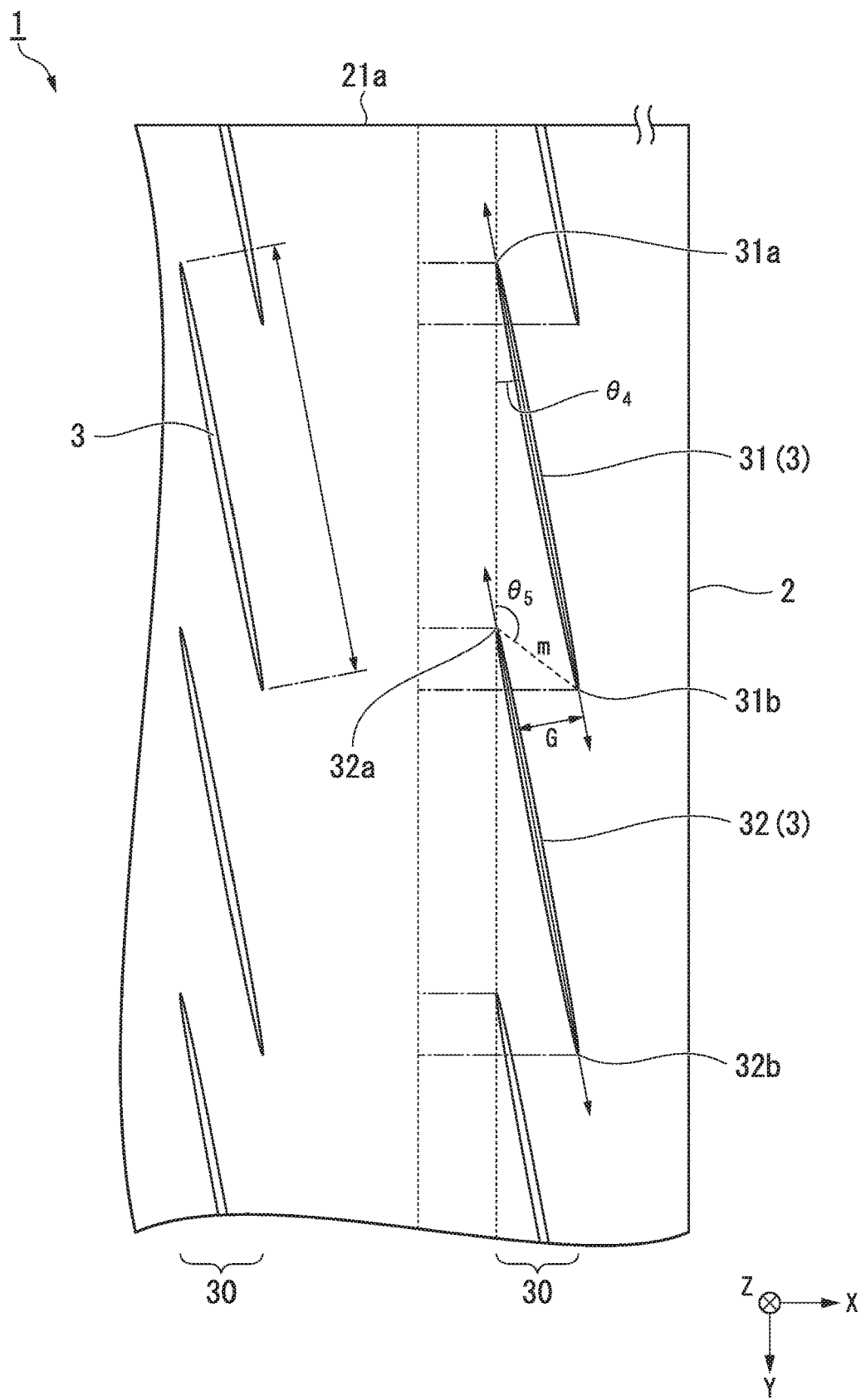
FIG. 18 is a view illustrating a groove that is formed in a steel sheet surface of a grain-oriented electrical steel sheet of Example 1.

A plurality of the grooves 31, 32, . . . , 3n were disposed in such a manner that the inclination angle θ4 with respect to the sheet width direction Y was set to 15°, a spaced distance G between a line connecting the groove end 31a and the groove end 31b of the groove 31, and a line connecting the groove end 32a and the groove end 32b of the groove 32 positioned in the vicinity of the groove 31 was set to 1 mm, overlapping was made by 3 mm, a length of a line segment m connecting the second groove end 32b of the first groove 31 and the first groove end 32a of the second groove 32 was set to approximately 3.4 mm, and an angle θ5 of the line segment m with respect to the sheet width direction Y was set to approximately 150° (refer to FIG. 18). In the longitudinal groove projection line LWP on the projection plane of the grain-oriented electrical steel sheet 100 of Example 1, the first groove end 32a of the second groove 32 is located on a further reference end 21a side in comparison to the second groove end 31b of the first groove 31. Accordingly, the overlapping region R is provided. The average groove group depth $D_A$ of the average groove group depth $D_A$ of Example 1 was 20 µm, and the minimum value of the total groove depth in the overlapping region R was 20 µm and was $0.5 \times D_A$ or greater. In addition, a plurality of grooves which were arranged in the sheet width direction Y were continuously formed in a state of being spaced away from each other with a pitch of 3 mm in the rolling direction X.

Example 2 to Example 4, which are different from Example 1 in the minimum value of the total groove depth, were prepared. That is, Example 2 is an example in which the minimum value of the total groove depth in the overlapping region R is 10 µm. Example 3 is an example in which the minimum value is 15 µm, and Example 4 is an example in which the minimum value is 25 µm.

Comparative Example 1

In Comparative Example 1, a grain-oriented electrical steel sheet, in which grooves having the same shape as in the grain-oriented electrical steel sheet 100 of Examples 1 are arranged without the overlapping region R, was prepared. That is, the plurality of grooves having the average groove depth D of 20 µm, the average groove width W of 100 µm, the aspect ratio of 0.2, and the first angle θ of 60° were arranged in the sheet width direction Y, but the overlapping region R was not formed in the longitudinal groove projection line on the projection plane of the grain-oriented electrical steel sheet of Comparative Example 1. The arrangement was made in such a manner that in the longitudinal groove projection line, the second groove end 31b of the first groove 31 was located on a further reference end 21a side in comparison to the first groove end 32a of the second groove 32, and an inclination angle of a line segment connecting the first groove end 32a of the second groove 32 and the second groove end 31b of the first groove 31 became perpendicular to the longitudinal groove direction L and became 75° with respect to the sheet width direction Y. That is, the minimum value of the total groove depth was 0 µm.

Comparative Example 2

In Comparative Example 2, a grain-oriented electrical steel sheet, in which the grooves are arranged to overlap each other similar to Example 1, but the minimum value of the total groove depth in the overlapping region R is less than $0.5 \times D_A$, was prepared. That is, a grain-oriented electrical steel sheet, in which the average groove group depth $D_A$ is 20 µm, and the minimum value of the total groove depth in the overlapping region R is 5 µm, was prepared as Comparative Example 2.

30 sheets of test pieces, which include one or more grooves and have a dimension of 600 mm per one side, were prepared from the grain-oriented electrical steel sheets of Examples 1 to 4, and Comparative Examples 1 and 2.

Contours of the grooves in Examples 1 and Comparative Examples 1 and 2 were specified on the basis of the contour specifying method as described above. First, a two-dimensional height distribution on ten straight lines $L_1$ to $L_{10}$ in the longitudinal groove direction L was measured with respect to the grooves in the examples and the comparative examples by using a non-contact laser meter (VK-9700, manufactured by Keyence Corporation). Ten patterns of contours of the grooves on the longitudinal groove cross-section were obtained on the basis of the measurement results. The average groove depth D was calculated from each of the ten patterns of contours of the longitudinal groove cross-section, and a contour of the longitudinal groove cross-section, in which the average groove depth D was the deepest, was extracted as a representative pattern. The average groove depth D of the representative pattern is illustrated in a column of the groove depth D in Table 1.

With respect to a plurality of groove groups 30 of Example 1, the average groove group depth $D_A$, and the total groove depth of respective points in the overlapping region R were measured. From the result, the average groove group depth $D_A$ of Example 1 was 20 µm, the minimum value of the total groove depth in the overlapping region R was 20 µm, and the above-described values were greater than $0.5 \times D_A$. It was clear that the minimum value of the total groove depth of the overlapping region R and the iron loss have a correlation, and in Example 1, when forming the overlapping region R so that the minimum value of the total depth becomes 10 µm or greater, it is possible to suppress the iron loss to 0.75 W/kg or less. In addition, from a result obtained by comparing Example 1 in which the first angle θ of the groove 3 is 30° or 45° and Example 1, when adjacent grooves 3, which constitute the groove group 30, overlap each other, and the minimum value of the total depth is $0.5 \times D_A$ or greater, in a case where the first angle θ of the groove 3 is 30°, 45°, and 60°, the iron loss hardly varied.

With respect to 30 sheets of the test pieces of Example 1, the iron loss $W_{17/50}$ (W/kg) when being subjected to AC excitation under conditions of the maximum magnetic flux density of 1.7 T and a frequency of 50 Hz was measured, and an average value thereof was calculated. The same measurement was performed with respect to 30 sheets of the test pieces of Comparative Example 1 to calculate an average value of the iron loss. The average value of the iron loss in the test pieces of Example 1 was $W_{17/50}$=0.72 (W/kg), and the average value of the iron loss of the test pieces of Comparative Example 1 was $W_{17/50}$=0.80 (W/kg). From the result, it could be seen that the grain-oriented electrical steel sheet of Example 1 was superior to the grain-oriented electrical steel sheet of Comparative Example 1 from the viewpoint of the iron loss.

Iron loss improvement comparison was made with respect to iron loss improvements of Examples 1 to 4, and Comparative Examples 1 and 2. The comparison result is illustrated in Table 1.

Evaluation of the iron loss improvement was performed as follows. The iron loss of steel sheets (steel sheets after the insulating film forming process S08) before performing grooving in Examples 1 to 4, and Comparative Example 1 and 2 was measured, and the iron loss was set as a reference iron loss to obtain an improvement rate of the iron loss with respect to the reference iron loss. From the result, with regard to the improvement rate of the iron loss, a satisfactory result was obtained in Example 2 and Example 3. In addition, in Example 1 and Example 4, the improvement rate of the iron loss was as very high as 20%. In Comparative Example 1 and Comparative Example 2, the improvement rate of the iron loss improvement rate was lower in comparison to the grain-oriented electrical steel sheets of Examples 1 to 4.

TABLE 1

| | Average groove group depth $D_A$ (unit: μm) | Minimum value of total groove depth in overlapping region R (unit: μm) | Improvement rate of iron loss (unit: %) |
|---|---|---|---|
| Example 1 | 20 | 20 | 20 |
| Example 2 | 20 | 10 | 16 |
| Example 3 | 20 | 15 | 18 |
| Example 4 | 20 | 25 | 20 |
| Comparative Example 1 | 20 | 0 | 10 |
| Comparative Example 2 | 20 | 5 | 12 |

Examples 5 to 18

Grain-oriented electrical steel sheets were prepared as follows. In the grain-oriented electrical steel sheets, a groove, in which the average groove depth D, the average groove width W in the longitudinal groove direction L, and the first angle θ were set as illustrated in Table 1, was formed in the steel sheet surface 2a by using the laser method under conditions in which the laser scanning pitch (interval PL) was set to 3 mm, the beam diameter was set to 0.1 mm in the rolling direction X and 0.3 mm in the scanning direction, and the scanning speed was set to 30 mm/s. In addition, as a comparative example, a grain-oriented electrical steel sheet was prepared as follows. A groove, in which the average groove depth D, the average groove width W in the longitudinal groove direction L, and the first angle θ were set as illustrated in Table 2, was formed in the grain-oriented electrical steel sheet.

With regard to a contour on a cross-section in the transverse groove direction Q, a two-dimensional height distribution of a groove at twenty straight lines in the transverse groove direction Q was measured by using the same non-contact laser meter. Twenty patterns of contours of the transverse groove cross-section of the groove were obtained on the basis of the measurement results. In the obtained twenty patterns of contours of the transverse groove cross-section, a depth from the steel sheet surface 2a to the surface (contour) of the groove was measured to calculate an average transverse groove depth $D_S$. In the transverse groove cross-sectional shape, two points having an average transverse groove depth of $D_S \times 0.05$, were extracted, and a distance between the two points was measured as the groove width W. An average value of the groove width W obtained from the twenty patterns was calculated as an average groove width. The average groove width (unit: μm) of the grain-oriented electrical steel sheets obtained in Examples 5 to 18 and Comparative Examples 3 to 5 is illustrated in Table 2.

TABLE 2

| | Average groove group depth $D_A$ (μm) | Minimum value of total groove depth in overlapping region R (μm) | Iron loss improvement | Average groove width W (μm) | Aspect ratio A = D/W | First angle θ (°) | $32 \times A^2 - 55 \times A + 73$ | $21 \times A + 77$ | Rust occurrence | Rust resistance |
|---|---|---|---|---|---|---|---|---|---|---|
| Example 5 | 10 | 10 | Good | 200 | 0.05 | 70.0 | 70.3 | 76.0 | None | Very good |
| Example 6 | 50 | 30 | Good | 200 | 0.25 | 56.0 | 61.3 | 71.8 | None | Very good |
| Example 7 | 10 | 10 | Good | 30 | 0.33 | 55.0 | 58.2 | 70.0 | None | Very good |
| Example 8 | 20 | 10 | Good | 50 | 0.40 | 54.0 | 56.1 | 68.6 | None | Very good |
| Example 9 | 15 | 15 | Good | 30 | 0.50 | 52.5 | 53.5 | 66.5 | None | Very good |
| Example 10 | 15 | 15 | Good | 20 | 0.75 | 48.0 | 49.8 | 61.3 | None | Very good |
| Example 11 | 50 | 30 | Good | 50 | 1.00 | 48.0 | 50.0 | 56.0 | None | Very good |
| Example 12 | 15 | 15 | Good | 300 | 0.05 | 73 | 70.3 | 76.0 | Occurred | Good |
| Example 13 | 50 | 30 | Good | 200 | 0.25 | 65 | 61.3 | 71.8 | Occurred | Good |
| Example 14 | 50 | 30 | Good | 150 | 0.33 | 60.5 | 58.2 | 70.0 | Occurred | Good |
| Example 15 | 10 | 10 | Good | 25 | 0.40 | 58 | 56.1 | 68.6 | Occurred | Good |
| Example 16 | 50 | 30 | Good | 100 | 0.50 | 56 | 53.5 | 66.5 | Occurred | Good |
| Example 17 | 15 | 15 | Good | 20 | 0.75 | 53 | 49.8 | 61.3 | Occurred | Good |
| Example 18 | 50 | 30 | Good | 50 | 1.00 | 51 | 50.0 | 56.0 | Occurred | Good |
| Comp. Ex. 3 | 20 | 0 | Poor | 100 | 0.20 | 75 | 63.3 | 72.8 | Occurred | Poor |
| Comp. Ex. 4 | 20 | 0 | Poor | 50 | 0.40 | 70 | 56.1 | 68.6 | Occurred | Poor |
| Comp. Ex. 5 | 20 | 5 | Poor | 20 | 1.00 | 60 | 50.0 | 56.0 | Occurred | Poor |

Examples 5 and 6 are examples which satisfy only relationships of Expression (1) and Expression (2) described in the embodiment. Examples 12 to 18 are examples which satisfy only a relationship of Expression (1) described in the embodiment. Examples 8 and 9 are examples which satisfy relationships of Expression (1) to Expression (4) described in the embodiment. Example 7 is an example that satisfies relationships of Expression (1), Expression (2), and Expression (4) described in the embodiment. Example 10 is an example that satisfies a relationship of Expression (1), Expression (2), and Expression (3) described in the embodiment. In addition, as Comparative Examples 3 to 5, grain-oriented electrical steel sheets, which do not satisfy Expression (1), were prepared.

Evaluation for the rust resistance was performed as follows. A test piece, which includes one groove and has a length of 30 mm per one side, was collected from each of the grain-oriented electrical steel sheets of the examples and the comparative examples, and was left as was indoors under conditions of a temperature of 50° C. and a humidity of 95% or greater for 48 hours, and then a rust occurrence situation in the test piece was confirmed. Presence or absence of rust was confirmed with the naked eyes. In addition, with regard to the rust resistance, the test piece was left as was in an atmosphere of a temperature of 50° C. and a humidity of 91% for one week, and evaluation was made on the basis of a variation of weight of the test piece before being left and after being left. When rust occurs, the weight of the test piece increases. Accordingly, as the weight increase amount was smaller, the rust resistance was determined as good. Specifically, the rust resistance of the test piece in which the weight increase amount was 1.0 mg/m$^2$ or less was evaluated as "very good", the rust resistance of the test piece in which the weight increase amount was 5.0 mg/m$^2$ or less was evaluated as "good", and the rust resistance of the test piece in which the weight increase amount was greater than 10.0 mg/m$^2$ was evaluated as "poor". As illustrated in Table 1, from a result of the verification of the rust resistance of the grain-oriented electrical steel sheets of Examples 5 to 18, when a groove satisfying at least Expression (1) is formed, it was confirmed that the rust resistance of the grain-oriented electrical steel sheets is improved.

The rust resistance of Comparative Examples 3 to 5 was evaluated as "poor".

In Examples 1 to 18, the grain size of the crystal grain, which is in contact with the groove in the steel sheet, was 5 μm or greater.

INDUSTRIAL APPLICABILITY

According to the aspects of the invention, an iron loss of a grain-oriented electrical steel sheet, in which a plurality of grooves are formed in a surface of a base metal, is improved, and rust resistance can be improved. Accordingly, the invention has sufficient industrial applicability.

BRIEF DESCRIPTION OF THE REFERENCE SYMBOLS

1: GRAIN-ORIENTED ELECTRICAL STEEL SHEET
2: STEEL SHEET
2a: STEEL SHEET SURFACE
3: GROOVE
X: ROLLING DIRECTION
Y: SHEET WIDTH DIRECTION
Z: SHEET THICKNESS DIRECTION
D: AVERAGE GROOVE DEPTH
$D_A$: AVERAGE GROOVE GROUP DEPTH
θ: FIRST ANGLE
W: AVERAGE GROOVE WIDTH
51: FIRST POINT
52: SECOND POINT
3E: GROOVE END STRAIGHT LINE
30: GROOVE GROUP
31: FIRST GROOVE
32: SECOND GROOVE
31a: FIRST GROOVE END
32b: SECOND GROOVE END

The invention claimed is:

1. A grain-oriented electrical steel sheet, comprising:
a steel sheet having a steel sheet surface in which a groove, which extends in a direction intersecting a rolling direction and of which a groove depth direction matches a sheet thickness direction, is formed,
wherein when the steel sheet surface is seen from the sheet thickness direction, the steel sheet surface is provided with a groove group that is constituted by a plurality of the grooves arranged with an interval in a sheet width direction,
the grooves, which constitute the groove group, are arranged in such a manner that adjacent grooves overlap each other on a projection plane being a YZ plane perpendicular to the rolling direction,
a plurality of the groove groups are arranged with an interval in the rolling direction,
when an end of the steel sheet in the sheet width direction is set as a reference end, grooves adjacent to each other among the plurality of grooves of each of the groove groups are set as a first groove and a second groove in an order close to the reference end, inclined portions are formed at the two groove ends of each of the grooves, which constitute the groove group, in a longitudinal groove direction, two groove ends of each of the grooves, which constitute the groove group, in a longitudinal groove direction are set as a first groove end and a second groove end in an order close to the reference end, a contour of the first groove that is projected onto the projection plane is set as a first longitudinal groove projection line, a contour of the second groove that is projected separately onto the projection plane is set as a second longitudinal groove projection line, an average depth in the contours of the plurality of grooves which constitute the groove group is set as an average groove group depth $D_A$ in a unit of μm, at the first groove end of the second longitudinal groove projection line, a point on the second longitudinal groove projection line, at which a depth from the steel sheet surface in the sheet thickness direction becomes $0.05 \times D_A$, is set as a first point, and at the second groove end of the first longitudinal groove projection line, a point on the first longitudinal groove projection line, at which a depth from the steel sheet surface in the sheet thickness direction becomes $0.05 \times D_A$, is set as a second point,
the depth of each of the contours of the plurality of grooves represents a maximum length from the steel sheet surface to a surface opposite to the steel sheet surface in the sheet thickness direction of each of the plurality of grooves,
each of the plurality of grooves has a plurality of depths measured along a central portion in the longitudinal groove direction,
the average groove depth in each of the contours of the plurality of grooves which constitute the groove group are an arithmetic mean of each of the respective plurality of depths of each of the plurality of grooves, the average groove group depth $D_A$ is an arithmetic mean of the average depths of each of the contours of the plurality of grooves, on the projection plane, a distance between the first point on the second longitudinal groove projection line and the reference end is shorter than a distance between the second point on the first longitudinal groove projection line and the reference end, and in an overlapping region between the first groove end of the second groove and the second groove end of the first groove, a total depth of a depth from the steel sheet surface in the sheet thickness direction at the second groove end of the first groove and a depth from the steel sheet surface in the sheet thickness direction at the first groove end of the second groove is $0.5 \times D_A$ or greater.

2. The grain-oriented electrical steel sheet according to claim 1, wherein when an arbitrary point on the first longitudinal groove projection line, which is included in the overlapping region, is set as P1, and among points on the second longitudinal groove projection line that is included in the overlapping region, a point, at which a distance from the reference end is the same as a distance between the point P1 and the reference end, is set as P2, in the overlapping region, a total depth of a depth of the first groove from the steel sheet surface to the point P1 on the first longitudinal groove projection line in the sheet thickness direction, and a depth of the second groove from the steel sheet surface to the point P2 on the second longitudinal groove projection line in the sheet thickness direction is $0.5 \times D_A$ or greater.

3. A grain-oriented electrical steel sheet, comprising:

a steel sheet having a steel sheet surface in which a groove, which extends in a direction intersecting a rolling direction and of which a groove depth direction matches a sheet thickness direction, is formed, wherein when the steel sheet surface is seen from the sheet thickness direction, the steel sheet surface is provided with a groove group that is constituted by a plurality of the grooves arranged with an interval in a sheet width direction, the grooves, which constitute the groove group, are arranged in such a manner that adjacent grooves overlap each other on a projection plane being a YZ plane perpendicular to the rolling direction, a plurality of the groove groups are arranged with an interval in the rolling direction, when one end of the steel sheet in the sheet width direction is set as a reference end, grooves adjacent to each other among the plurality of grooves of each of the groove groups are set as a first groove and a second groove in an order close to the reference end, inclined portions are formed at the two groove ends of each of the grooves, which constitute the groove group, in a longitudinal groove direction, two groove ends of each of the grooves, which constitute the groove group, in a longitudinal groove direction are set as a first groove end and a second groove end in an order close to the reference end, a contour of the first groove that is projected onto the projection plane is set as a first longitudinal groove projection line, a contour of the second groove that is projected separately onto the projection plane is set as a second longitudinal groove projection line, an average value of depths of the first longitudinal groove projection line from the steel sheet surface in the sheet thickness direction is set as a first average groove depth $D_I$ in a unit of μm, an average value of depths of the second longitudinal groove projection line from the steel sheet surface in the sheet thickness direction is set as a second average groove depth $D_{II}$ in a unit of μm, at the first groove end of the second longitudinal groove projection line, a point, at which a depth from the steel sheet surface in the sheet thickness direction becomes $0.05 \times D_{II}$, is set as a third point, and at the second groove end of the first longitudinal groove projection line, a point, at which a depth from the steel sheet surface in the sheet thickness direction becomes $0.05 \times D_I$, is set as a fourth point, the depth of each of the plurality of grooves represents a maximum length from the steel sheet surface to a surface opposite to the steel sheet surface in the sheet thickness direction, each of the plurality of grooves has a plurality of depths measured along a respective longitudinal groove projection line, the average groove depth in each of the plurality of grooves are an arithmetic mean of each of the respective plurality of depths, on the projection plane, a distance La between the third point on the second longitudinal groove projection line and the reference end is shorter than a distance Lb between the fourth point on the first longitudinal groove projection line and the reference end, and in an overlapping region between the first groove end of the second groove and the second groove end of the first groove, a total depth of a depth from the steel sheet surface in the sheet thickness direction at the first groove and a depth from the steel sheet surface in the sheet thickness direction at the second groove is $0.25 \times (D_I + D_{II})$ or greater.

4. The grain-oriented electrical steel sheet according to claim 3, wherein when at the second groove end of the first longitudinal groove projection line, a point, at which a depth from the steel sheet surface in the sheet thickness direction becomes $0.95 \times D_I$, is set as a fifth point, and at the first groove end of the second longitudinal groove projection line, a point, at which a depth from the steel sheet surface in the sheet thickness direction becomes $0.95 \times D_{II}$, is set as a sixth point, a distance Lc between the fifth point on the first longitudinal groove projection line and the reference end is shorter than a distance Ld between the sixth point on the second longitudinal groove projection line and the reference end.

5. The grain-oriented electrical steel sheet according to claim 1, wherein in the steel sheet, a grain size of a crystal grain, which is in contact with the groove, is 5 μm or greater.

6. The grain-oriented electrical steel sheet according to claim 3, wherein in the steel sheet, a grain size of a crystal grain, which is in contact with the groove, is 5 μm or greater.

* * * * *